United States Patent
Nagahiro et al.

Patent Number: 5,431,861
Date of Patent: Jul. 11, 1995

[54] METHOD OF AND APPARATUS FOR PRODUCING A HIGH CONCENTRATION OZONE WATER SOLUTION

[75] Inventors: Jinzo Nagahiro, 54-24, Wakamiya 2-chome, Nakano-ku, Tokyo; Ken Higuchi; Yasunori Ohama, both of Saitama, all of Japan

[73] Assignee: Jinzo Nagahiro, Tokyo, Japan

[21] Appl. No.: 208,731

[22] Filed: Mar. 8, 1994

[30] Foreign Application Priority Data

Mar. 15, 1993 [JP] Japan .................. 5-053982

[51] Int. Cl.⁶ .................................... B01F 13/04
[52] U.S. Cl. ........................... 261/140.1; 261/36.1; 261/DIG. 75; 261/DIG. 42
[58] Field of Search ...... 261/DIG. 42, 36.1, DIG. 75, 261/DIG. 42, 140.1

[56] References Cited

U.S. PATENT DOCUMENTS

| | | | |
|---|---|---|---|
| 1,808,956 | 6/1931 | Ketterer | 261/DIG. 75 |
| 2,388,753 | 11/1945 | Mallmann et al. | 261/DIG. 42 |
| 2,521,215 | 9/1950 | Haddeland | 261/DIG. 75 |
| 3,775,314 | 11/1973 | Beitzel et al. | 261/DIG. 42 |
| 4,049,552 | 9/1977 | Arff | 261/DIG. 42 |
| 4,555,335 | 11/1985 | Burris | 261/DIG. 42 |
| 4,766,001 | 8/1988 | Mizandjian et al. | 261/36.1 |
| 5,314,076 | 5/1994 | La Place et al. | 261/DIG. 42 |

FOREIGN PATENT DOCUMENTS

1-33211 7/1989 Japan.
1046363 10/1966 United Kingdom ....... 261/DIG. 42

OTHER PUBLICATIONS

J. Nagahiro, J. Iwamoto, K. Higuchi, "Flow Visualization Study on the Production Mechanism of Fine Air Bubbles in Liquids Using Ejectors", *Transactions of the ASAE*, Sep.–Oct. 1992, vol. 35, No. 5, 1591–1595.
Agricural and Machinery Society Journal, vol. 51, No. 3, pp. 81–88, Ejector Type Gas–Nozzle Producing Fine Air Bubbles, after Sep. 1981.

*Primary Examiner*—Tim R. Miles
*Attorney, Agent, or Firm*—Klarquist Sparkman Campbell Leigh & Whinston

[57] ABSTRACT

An ejector-type gas nozzle 17 including a liquid nozzle and a gas nozzle is used. Raw material water A in ozone reaction tank 1 is pumped and pressurized by pump 19 to use it circulatingly as water jet A of the ejector gas nozzle 17. The liquid nozzle of ejector-type gas nozzle 17 introduces the water jet A into the raw material water A in the ozone reaction tank 1. Ozone gas is sucked by negative pressure to be generated along the stream of water jet A so that it is injected into the raw material water A from the gas nozzle of ejector-type gas nozzle 17 as fine gas bubbles. A high concentration ozone water solution is produced by dissolving ozone into the raw material water A due to the gas-liquid reaction between the ozone fine gas bubbles and the raw material water A.

12 Claims, 7 Drawing Sheets

METHOD OF AND APPARATUS FOR PRODUCING A HIGH CONCENTRATION OZONE WATER SOLUTION

BACKGROUND OF THE INVENTION

1. Field of the Invention

The present invention relates to a method and an apparatus for producing a high concentration ozone water solution with a long half-life period based on a gas-liquid reaction between ozone and water.

2. Description of the Related Art

Ozone ($O_3$) is chemically instable and changes into oxygen ($O_2$) usually in several to several tens of seconds in the air or water. In particular, when it is in contact with bacteria, such as fungi, mould and algae, or organic substances emitting offensive odors, it changes into oxygen in a moment. Ozone presents strong oxydizing action when it changes into oxygen, and the oxydizing ability is second to fluorine among the naturally existing elements, which is 7 times the oxidizing effect and about 3000 times the oxidizing rate with respect to chlorine.

For the reason above, ozone has been utilized for sterilization, deodorization and bleaching, for example, in treating tap water, sewage or waste water of the water treatment works, super-precision dry cleaning or sterilization of clean rooms in the semiconductor industry, deodorization and sterilization of the air and filters in the air conditioning, coating or oxydizing treatment prior to adhesion process in the surface treatment technology, material tests utilizing oxidizing effect, such as deterioration tests on rubber or plastic materials or electric contact points, or sterilizing and deodorizing operative appliances or medical waste matter in the medical industry. Further, such an ozone treatment has been utilized not only in large-scale industries but over smaller businesses including the household scale.

There are two ways of utilizing ozone, one using gas-phase ozone and the other using liquid-phase ozone produced by dissolving an ozone gas in the water. In either case, the aim is the same in utilizing the strong bactericidal, deodorizing and bleaching action of ozone.

Both the gas-phase ozone and the liquid-phase ozone are utilized widely as mentioned above. In particular, as shown in Table 1, the liquid-phase ozone is used for purifying or sterilizing, deodorizing and bleaching tap water or sewage as well as used for similar treatments in the fish farming, stock raising and food processing industries.

TABLE 1

| Industrial Fields | Subjects | Objects |
|---|---|---|
| Treatment of tap water | Public water service Public housing Home-service drinking water | Water purification plants (sterilization and deodorization) Cleaning of water supply tanks Making drinking water pleasing to the palate |
| Sewage disposal | Public sewer systems Dyeing factories and hospitals | Bleaching, deodorization and sterilization Waste water disposal |
| Housing | Cooling towers Pools and public baths | Water sterilization and removal of algae Sterilization and deodorization |
| Production of perishable foods | Cold saltwater sterilization of fishes and shellfishes Thawing of frozen foods Cleaning and sterilization of vegetables Cleaning of food processing places | Sterilization of water used in packages and retention of freshness Upgrading of finishings Retention of freshness Cooking appliances and sterization of floors |
| Fish farming and stock raising Agricultural industry | Water tanks for living fishes Drinking water for pig raising and poultry farming Seeds, vegetables and fruits | Increasing amount of oxygen dissolved in water and decomposition of remaining feed Sterilization and making meat pleasing to the palate Sterilization and cleaning processing |
| Medical industry | Medical appliances Dental treatment | Sterilization Treatment of stomatitis |

To produce an ozone water solution, there is a well-known method in which a spherical glass filter having a 30 mm diameter and a pore size of about 45 to 50 μm or a porous tubular ceramic air diffuser is attached to the bottom of an ozone-water contact reaction tank to produce an ozone water solution by introducing an ozone gas generated by an ozone generator (ozonizer) into the tank through the diffuser and diffusing the so-formed ozone gas bubbles in the water contained in the tank thereby causing a gas-liquid reaction. This method is used most generally in various industrial fields.

In this case, the amount of ozone to be dissolved from the gas bubbles into water per unit time can be calculated by equation (1).

$$Q_z = K_L \cdot a (K \cdot C_G - C_L) \tag{1}$$

where:
$Q_z$ = amount of ozone to be dissolved in the water per unit time,
$K_L$ = coefficient of total matter transfer,
$a$ = total surface area of all gas bubbles present in the water (m$^2$),
$K$ = distribution coefficient of ozone gas to water,
$C_G$ = concentration of ozone gas (g/m$^3$),
$C_L$ = concentration of ozone present in the water (g/m$^3$).

As is seen from equation (1), when the ozone water solution is produced under specific condition, both coefficient $K_L$ of total matter transfer and distribution coefficient $K$ of ozone gas to water are not changed. Therefore, the most important parameter in producing the ozone water solution under that condition is the total surface area $a$ of all gas bubbles present in the water.

The total surface area $a$ of all gas bubbles is determined by the diameter of bubbles, rising velocity of bubbles, depth of water in the reaction tank or the like factors. Thus, to increase the efficiently of ozone dissolution, it is necessary to reduce the diameter of bubbles by increasing the depth or pressure of water in the the closed reaction tank.

In case of the aforementioned conventional method of producing an ozone water solution, when the depth or pressure of water in the reaction tank is increased, the pressure of ozone gas to be sent to the spherical glass filter or air diffuser attached to the bottom of the reaction tank must be also increased. However, since the increase of ozone gas pressure leads to increase of the driving power for supplying the ozone gas, the practical depth of the reaction tank is limited to several meters or less. That is, the water depth of the reaction tank is limited in the light of cost to be needed for the driving force. Therefore, it is difficult to increase the efficiency of ozone dissolution by the way of increasing the water depth or water pressure.

In case of dissolving ozone into the water by the gas-liquid contact reaction, it is preferred to reduce the diameter of gas bubbles as small as possible in view of increasing the surface area of bubbles to be in contact with water. However, the mean diameter of gas bubbles to be generated from a usual spherical glass filter or air diffuser is about 3 mm. Therefore, it is very difficult to obtain the gas bubbles having a mean diameter less than that value by such a spherical glass filter or air diffuser. Though other bubble generators based on the principle different from that of the spherical glass filter or air diffuser have been used, the mean diameter of bubbles produced thereby is also 2 to 3 mm. Accordingly, almost all of the produced gas bubbles rise vertically and linearly in the water of the reaction tank so that only a small amount of ozone can be dissolved in the water, but almost all of ozone is dispersed in the air after rising through the water. Thus, it is difficult to produce a high concentration ozone water solution with high efficiency within a predetermined time period.

Accordingly, it has been very difficult to produce a high concentration ozone water solution by the conventional methods for both the economical and technological reasons as mentioned above. Therefore, the range of practical use or industrial effectiveness of the ozone water solution has been limited so far.

Another reason for degrading effectiveness of the ozone water solution Is the fact that the half-life period of ozone present in the water is far shorter than that of gas-phase ozone. Namely, the half-life period of ozone in the water is several tens of minutes in case of neutral water at ordinary temperature, and is further shortened (e.g., up to several tens of seconds in an extreme case) by pH and ternperature of water or a small amount of organic or inorganic substance present in the water. This is because the large portion of ozone dissolved in the water is consumed for oxidizing such impurities. Therefore, in such a case, it is necessary to dissolve in advance a great amount of ozone in the water to obtain an ozone water solution having a desirable concentration.

If pure water or ultra-pure water containing theoretically almost no impurities was used as the raw material water, an ozone water solution having a desirably long half-life period would be obtained. In such a case, however, the production cost of the ozone water solution becomes extremely high in proportion to the cost of the raw material water. Therefore, except for the sterilization of medical appliances or the like uses in which a relatively high cost can be allowed to some extent, such a method is not suitable generally in view of the cost. That is, an ozone water solution of a much lower cost than that case should be required, for example, for cleaning of food processing places, cleaning and sterilization of vegetables or the like in the field of perishable food production, and sterilization and deodorization of water purification plants in the field of water supply.

To solve these problems, various studies have been done so far with respect to the half-life period of the ozone water solution. However, the method which can satisfy both the desirable half-life period (e.g., 4 to 5 hours or longer) of the ozone water solution and the condition of using a low cost raw material water to produce a practically allowable low cost ozone water solution has not been established yet.

SUMMARY OF THE INVENTION

The present invention was made to solve the aforementioned problems lying in the conventional method of producing an ozone water solution. Therefore, it is an object of this invention to provide a method of and an apparatus for producing an economical and useful ozone water solution having a high concentration and a relatively long half-life period.

To achieve the above object, the present invention provides a method of producing a high concentration ozone water solution, comprising preparing an ejector-type gas nozzle having a liquid nozzle and a gas nozzle, pumping and pressurizing raw material water in an ozone reaction tank with pumping means to use the pressurized water circulatingly as a water jet of the ejector-type gas nozzle, injecting the water jet into the raw material water in the ozone reaction tank from the liquid nozzle of the ejector-type gas nozzle, introducing an ozone gas as fine gas bubbles into the raw material water by negative pressure to be generated along the stream of the water jet, whereby ozone is dissolved in the raw material water due to an gas-liquid reaction between the fine gas bubbles of the ozone gas and the raw material water so as to produce a high concentraion ozone water solution.

In the method of producing a high concentration ozone water solution according to the present invention, it is preferred that a pressurizing tank having a closed structure is used as the ozone reaction tank to increase the internal pressure of the tank by introducing the ozone gas to the upper gas phase in the ozone reaction tank, so as to elevate the pressure to the raw material water in the ozone reaction tank by a level within the range of 0 to 3 $kgf/cm^2G$.

It is also preferred in the inventive method that acidic electrolyzed water with a pH value of 2 to 5.5 or neutral distilled water or deionized water of pH 7 is used as the raw material water, and the temperature of the raw material water is kept at 3° to 15° C.

The method of producing a high concentration ozone water solution according to the present invention can use dried air or pure oxygen as the raw material ozone gas. It is preferable to use pure oxygen.

Alternatively to achieve the above object, the present invention provides an apparatus for producing a high concentration ozone water solution, comprising an ozone reaction tank with a closed structure for containing raw material water, an ejector-type gas nozzle for inducing a water jet into the ozone reaction tank and sucking an ozone gas by negative pressure to be caused by the stream of the water jet to supply the ozone gas as air bubbles into the raw material water in the ozone reaction tank, and a water jet pressure transfer pump for pumping and pressurizing the raw material water in the ozone reaction tank to transfer it as the water jet to the ejector-type gas nozzle by pressure.

In addition to the above construction, the apparatus for producing a high concentration ozone water solution according to the present invention may be provided with ozone gas introducing means for introducing the ozone gas into the upper gas phase of the ozone reaction tank and a pressure controller for controlling the pressure of the upper gas phase of the ozone reaction tank.

Further, the apparatus according to this invention may include a raw material water cooler for cooling the raw material water in the ozone reaction tank.

According to the method of producing a high concentration ozone water solution of the present invention, since the ozone gas is injected into the raw material water as fine gas bubbles through the ejector-type gas nozzle, more than 80% of the ozone gas bubbles introduced into the raw material water have diameters of 10 to 200 μm, and the mean diameter of all the gas bubbles is about 50 to 150 μm. Therefore, this method makes it possible to produce and retain such extremely fine gas bubbles stably and continuously in the raw material water. Accordingly, the contact surface area of the ozone gas to the raw material water in the gas-liquid reaction can be markedly increased. Additionally, the dissolution efficiency of ozone to the raw material water can be enhanced because the raw material water can be used as the water jet and circulated during the gas-liquid reaction due to the ejector-type gas nozzle.

Further, in the inventive method of producing a high concentration ozone water solution, the dissolution (or concentration) of the ozone gas in the raw material water can be also enhanced by increasing the pressure of the raw material water due to the increase of the internal pressure of the ozone reaction tank by the ozone gas introduction into the upper gas phase of the tank.

These and other objects, features and advantages of the present invention will be more apparent from the following description of a preferred embodiment, taken in conjunction with the accompanying drawings.

DETAILED DESCRIPTION OF THE EMBODIMENT

Hereinafter, an embodiment of the present invention will be described with reference to the drawings.

Figure 1:
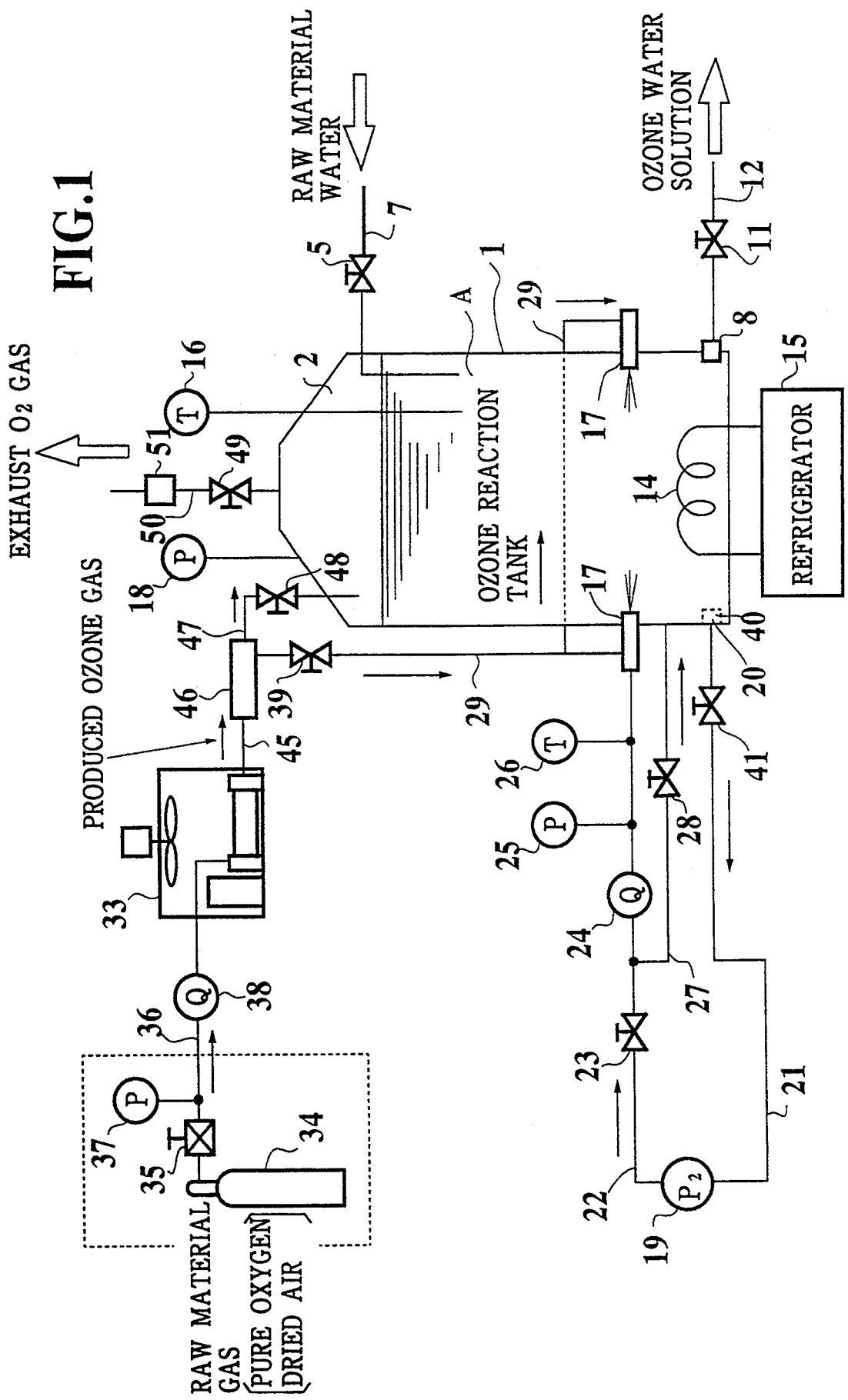
FIG. 1 is a block diagram showing an embodiment of the apparatus for producing an ozone water solution according to the present invention.
Figure 2:
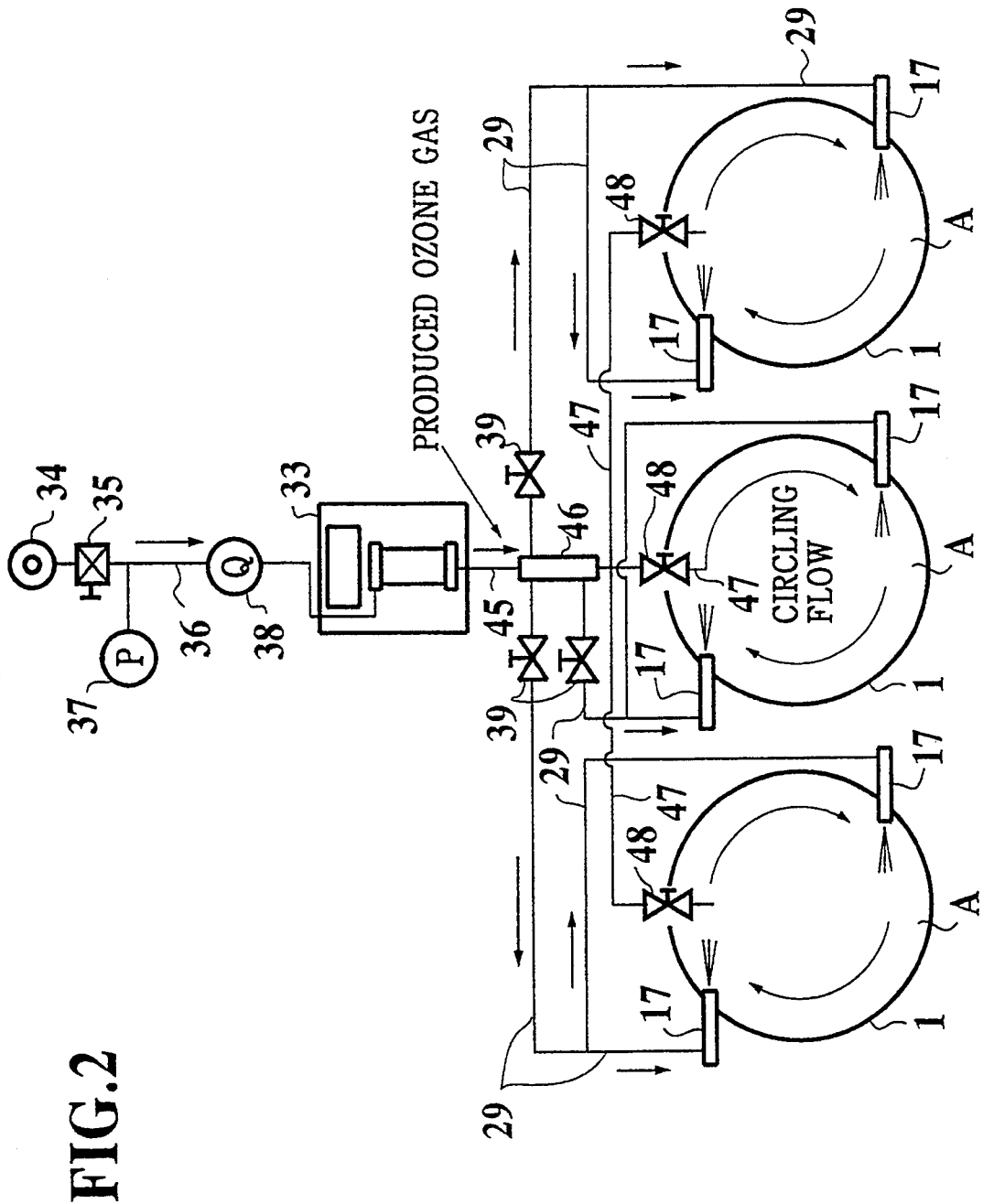
FIG. 2 schematically shows an embodiment of the ozone reaction tank used in the apparatus for producing an ozone water solution according to the present invention.

FIGS. 1 and 2 respectively show an embodiment of the apparatus for producing an ozone water solution according to the present invention. This ozone solution producing apparatus includes an ozone reaction tank 1. The ozone reaction tank 1 is constructed with a pressurizing tank having a closed structure. In this embodiment, the tank 1 in the drawings has a column-like shape with a circular cross-section. However, it is also possible that the ozone reaction tank 1 has any given shape other than that column-like shape with a circular cross-section.

At an upper portion of the ozone reaction tank 1 a raw material water supply conduit 7 having a flow amount control valve 5 at its intermediate portion is connected. The conduit 7 supplies raw material water A selected from the group consisting of electrolized water, distilled water and deionized water to the ozone reaction tank 1 corresponding to the operation of flow amount control valve 5. In such a manner, the ozone reaction tank 1 is filled with a predetermined amount of raw material water A.

Near the bottom of ozone reaction tank 1 an outlet 8 for discharging ozone water solution is provided. In addition, an ozone solution discharging conduit 12 having a valve 11 at its intermediate portion is connected to the outlet 8. Thus, a predetermined concentration ozone solution is taken out from the ozone solution discharging conduit 12 after completion of the gas-liquid reaction in the ozone reaction tank 1.

A heat exchanger 14 is placed in the ozone reaction tank 1. Further, a refrigerator 15 is connected to the heat exchanger 14 to supply thereto a cooling medium for cooling the raw material water A in the ozone reaction tank 1. Thus, the temperature of raw material water A in the ozone reaction tank 1 can be controlled within a predetermined range, under 15° C. but over the freezing point, preferably 6° to 10° C . In that case, the temperature of raw material water A in the ozone reaction tank 1 is checked by a thermometer 16.

As shown in FIG. 2, two ejector-type gas nozzles 17 are provided in the side wall of ozone reaction tank 1 near the bottom thereof. Each gas nozzle 17 is so directed as to make the raw material water A circle in the tank due to the water jet generated from the gas nozzle. That is, each gas nozzle is directed in substantially the tangential direction to the side wall of ozone reaction tank 1. In this case, the number of gas nozzles 17 is two, but it is also possible to use only one or more than two gas nozzles 17 in this embodiment.

These ejector-type gas nozzles 17 are respectively connected to a discharging port of water jet pressure transfer pump 19 through a water jet pressure transfer conduit 22. Further, the pump 19 is connected to a pumped raw material water outlet 20 provided in the side wall of ozone reaction tank 1 near the bottom thereof. At the outlet 20 a filter 40 is attached.

Thus, the pump 19 pumps the raw material water A being used in the gas-liquid reaction in the ozone reaction tank 1 as water jet through a valve 41 from the outlet 20, and sends the water jet with pressure to the pressure transfer conduit 22. In the intermediate portion of the conduit 22, a water jet flow control valve 23, a small liquid flow meter 24, a pressure gauge 25 and a thermometer 26 are connected, respectively.

Hereinafter, the water jet derived from the raw material water A will be called "water jet A".

The flow amount control valve 23 may be a usual flow amount control valve of variable throttle type which is driven either by manual operation or by remote operation using an actuator for quantitatively controlling or changing the flow amount of water jet A flowing in the pressure transfer conduit 22. The flow amount of water jet A controlled by the flow amount control valve 23 is checked by the small liquid flow meter 24.

Further, a water jet return conduit 27 for returning excessive raw material water A to the ozone reaction tank 1 is connected as a branch to the water jet pressure transfer conduit 22 between the water jet flow amount control valve 23 and the ejector-type gas nozzle 17. In the midway of the water jet return conduit 27 to the ozone reaction tank 1 a water jet pressure control valve 28 is disposed.

The pressure control valve 28 may be a relief valve which can change the relief pressure to control the pressure of water jet A to be sent to the ejector-type gas nozzle 17. The pressure and temperature of the water jet A are checked by the pressure gauge 25 and thermometer 26, respectively.

Namely, the batch-type ozone solution producing apparatus shown in FIG. 1 is constructed as a closed circuit in which the raw material water A prepared for the gasliquid reaction is also used as water jet to be circulated therein. Thus, the dissolution of ozone into the raw material water A in the gas-liquid reaction is promoted by pressurizing the raw material water A due to the pumping action of the water jet pressure transfer pump 19 when it passes through the pump. As a result, the ozone concentration in the ozone water solution can be increased.

Figure 3:
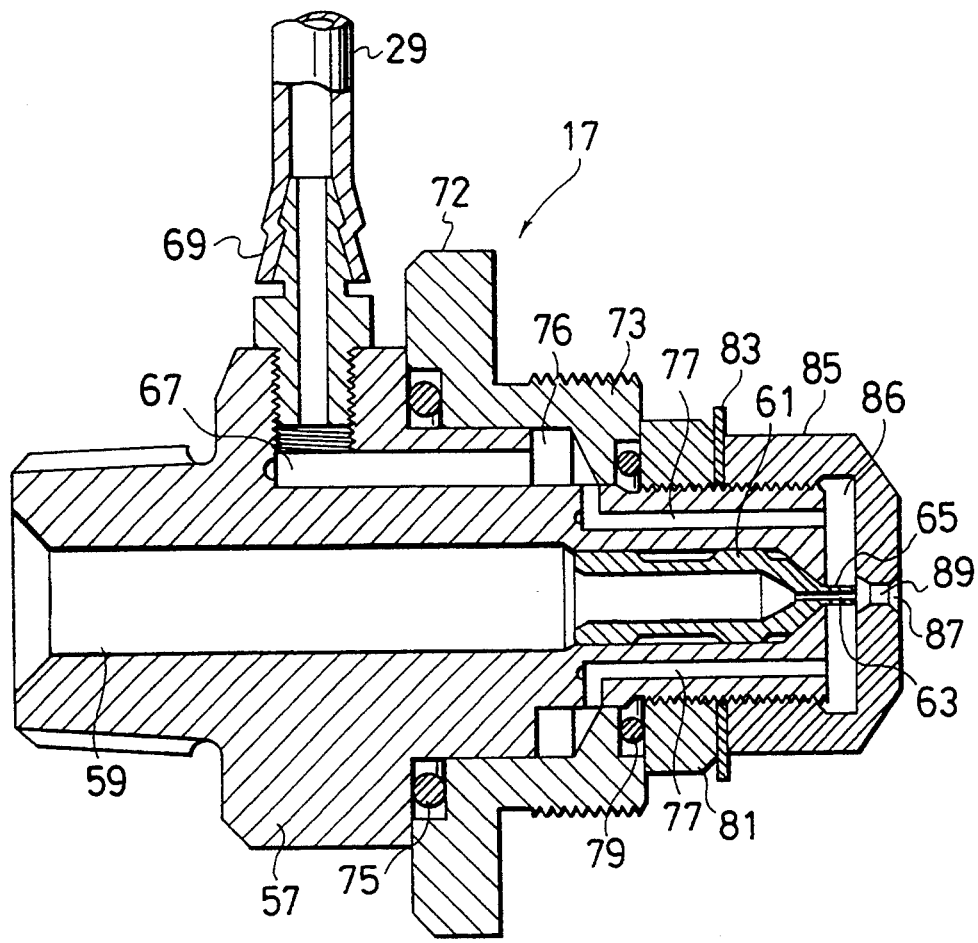
FIG. 3 is a vertical cross-section showing an embodiment of the ejector-type gas nozzle used in the apparatus for producing an ozone water solution according to the present invention.

Next, the ejector-type gas nozzle 17 will be described with reference to FIGS. 3 and 4. This ejector-type gas nozzle has a structure equivalent to the ejector-type gas nozzle disclosed in Japanese Patent Application for Publication No.(HEI)1-33211 (Patent No. 1549061).

The ejector-type gas nozzle 17 has a nozzle main body 57 in which is formed a water jet passage 59 communicating with the water jet pressure transfer conduit 22 for injecting the water jet into the ozone reaction tank 1. In the distal portion of nozzle main body 57, a liquid nozzle 61 is detachably inserted. Further, a nozzle needle 65 is secured at the distal end of liquid nozzle 61 projecting forward from the central distal portion of nozzle main body 57.

The liquid injection hole 63 formed in the nozzle needle 65 communicates with the water jet passage 59 so that the raw material water A pressurized and transferred through the passage 59 is injected forward from the liquid injection hole 63. In this case, the outer diameter $d_1$ of nozzle needle 65 is about 0.6 to 1.6 mm, and its inner diameter $d_2$ or the caliber of liquid injection hole 63 is about 0.3 to 1.2 mm.

Additionally, a pumped gas passage 67 is formed in the nozzle main body 57. The gas passage 67 is connected with a pumped ozone gas conduit 29 by a nipple 69 at one end. Around the outer circumference of the cylindrical portion of nozzle main body 57, a tubular outer case 73 having a nozzle attaching flange 72 is fitted airtightly through an O ring 75. The pumped gas passage 67 communicates at its one end with an annular passage 76 formed between the nozzle main body 57 and the outer case 73. The annular passage 76 is formed around a portion of nozzle main body 57 in which the liquid nozzle is disposed, and communicates with a plurality of pumped gas passages 77 respectively opening at the distal face of nozzle main body 57.

Around the outer circumference of the distal portion of nozzle main body 57, a spacer ring 81 and a shim ring 83 for the gas nozzle positioning are fitted detachably and airtightly through an O ring 79, respectively. Further, a gas nozzle member 85 having a cap-like shape is exchangeably secured to the distal end of main body 57 by thread engagement. Between the distal end face of nozzle main body 57 and the gas nozzle member 85 a gas suction cavity 86 communicating with the pumped gas passages 77 is provided. Crossing the central portion of the gas suction cavity 86, the nozzle needle 65 extends forward.

In addition, a gas injection hole 87 is formed in the distal central portion of gas nozzle member 85 communicating with the cavity 86. That is, the gas injection hole 87 is formed concentrically around the nozzle needle 65 defining a parallel passage 89 which extends coaxially and parallel to the liquid injection hole 63. The length of parallel passage 89 is about 1 to 6 mm, and its inner diameter dg (see FIG.4) is about 0.8 to 2.0 mm.

By those dimensions, a guzzling phase is formed between the outer circumference of nozzle needle 65 and the inner circumference of parallel passage 89. The thickness of the guzzling phase $\delta_g$ is determined by $(d_g - d_1)/2$, the value of which is in the range of 0.1 to 0.2 mm. The spacing $\Delta L$ between the entrance of parallel passage 89 and the distal end of nozzle needle 65 is about 0 to $-6$ mm, which is adjusted by exchanging the shim ring 83 for another having a suitably different thickness.

Figure 4:
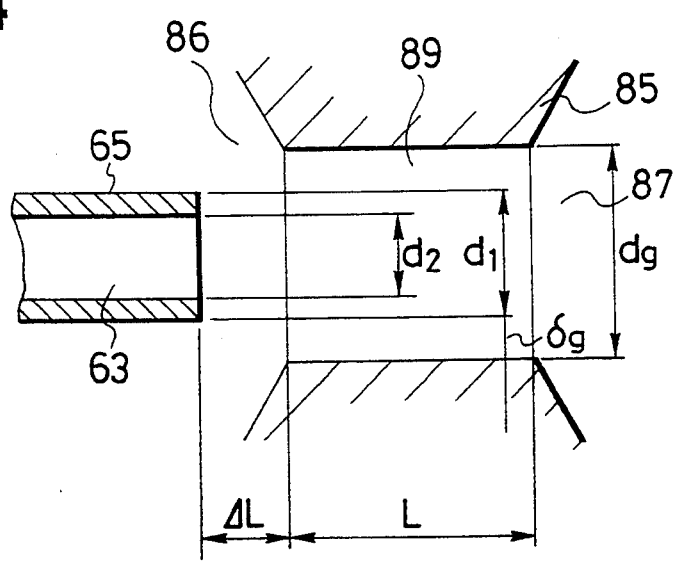
FIG. 4 is a vertical cross-section showing an enlarged view of an injection hole of the ejector-type gas nozzle used in the apparatus for producing an ozone water solution according to the present invention.

The negative value of $\Delta L$ means that the distal end of nozzle needle 65 is located on the left side of the entrance of parallel passage 89 in FIG.4. On the other hand, when the value of $\Delta L$ is positive, the distal end of nozzle needle 65 is located on the right side of the entrance of parallel passage 89.

Further, the aforementioned pumped ozone gas conduit 29 is connected to an ozonizer (ozone gas generator) 33 for generating an ozone gas to be sucked by the ejector-type gas nozzle 17.

FIG. 2 shows a case in which only one ozonizer 33 is provided as ozone generator for a plurality of ozone reaction tanks 1 to be used by them in common.

As shown in the same drawing, the ozonizer 33 is connected to a gas cylinder 34 on the side of its gas inlet through a raw material gas supply conduit 36. The raw material gas for producing the ozone gas to be supplied to the ozonizer 38 is dried air or pure oxygen filled in the gas cylinder 34. Before supplied to the ozonizer 33 through the raw material gas supply conduit 36, the pressure of the raw material gas is reduced by a pressure reducing valve 35 to the atmospheric pressure or a value near the pressure of raw material water A in the ozone reaction tank 1.

In that case, a pressure gauge 37 and a gas flow meter 38 are connected to the raw material gas supply conduit 36 to check the pressure and flow amount of the raw material gas, respectively.

The ozonizer 33 is connected to an ozone gas distributor 46 on the side of its gas outlet through a produced ozone gas transfer conduit 45. To the ozone gas distributor 46 are respectively connected a pumped ozone gas conduit 29 for distributing the produced ozone gas to the ejector-type gas nozzle 17 and a produced ozone gas introducing conduit 47 for distributing the ozone gas into the space 2 defined between the surface of raw material water A in the ozone reaction tank 1 and the top inner wall of the tank 1.

The ozone gas produced by the ozonizer 33 is introduced into the ozone gas distributor 46 through the produced ozone gas transfer conduit 45. Then, the flow amount of the ozone gas is controlled by the flow amount control valve 39 having a variable throttle applicable to a small amount of gas. Thereafter, the ozone gas is supplied to the ejector-type gas nozzle 17 through the pumped ozone gas conduit 29.

Of the produced ozone gas introduced into the ozone gas distributor 46, the ozone gas other than that supplied to the ejector-type gas nozzle 17 through the conduit 29 is distributed by the distributor 46 to the upper internal space 2 of ozone reaction tank 1 through the produced ozone gas conduit 47. Thus, the raw material water A in the ozone gas reaction tank 1 is pressurized by the distributed ozone gas. In the midway of conduit 47, a valve 48 for selectively supplying the produced ozone gas into the space 2.

At the top of ozone reaction tank 1 an ozone gas bleed conduit 50 is attached in communication with the upper internal space 2. The bleed conduit 50 is provided with an automatic pressure adjusting valve 49 and an ozone killer 51.

The pressure adjusting valve 49 operates to bleed the ozone gas from the upper internal space 2 in the reaction tank 1 to equalize the pressure of ozone gas in the space 2 with a predetermined pressure of raw material water A in the reaction tank 1.

The ozone killer changes the detrimental ozone gas into oxygen through a catalyst, such as active charcoal, or the like changing means.

In that case, the pressure in the upper internal space 2 is checked by a pressure gauge 18.

Next, operation of the ozone solution producing apparatus having the structure mentioned above will be described.

First, the water jet pressure transfer pump 19 is driven to produce an ozone water solution. Then, the raw material water in the ozone reaction tank 1 is pumped and pressurized by the pump to be transferred to the water jet pressure transfer conduit 22. The flow amount of the so produced water jet A is controlled by the flow control valve 23. At the same time, the water jet pressure control valve 28 operates in response to the pressure of water jet A to return excessive water jet A to the ozone reaction tank 1 through the water jet return conduit 27. In that manner, the pressure of water jet A in the water jet pressure transfer conduit 22 is adjusted in response to the relief pressure of pressure control valve 28.

Thus, to the liquid passage 59 of each ejector-type gas nozzle 17 is successively supplied the water jet A the flow amount of which is controlled by the flow amount control valve 23 and the pressure of which is adjusted by the pressure control valve 28. Accordingly, the flow amount of water jet A in the liquid passage 59 of ejector-type gas nozzle 17 is controllable corresponding to a predetermined flow amount of flow control valve 23. Likewise, the pressure of water jet A in the same passage 59 is adjustable corresponding to a predetermined relief pressure of pressure control valve 28.

Figure 5:
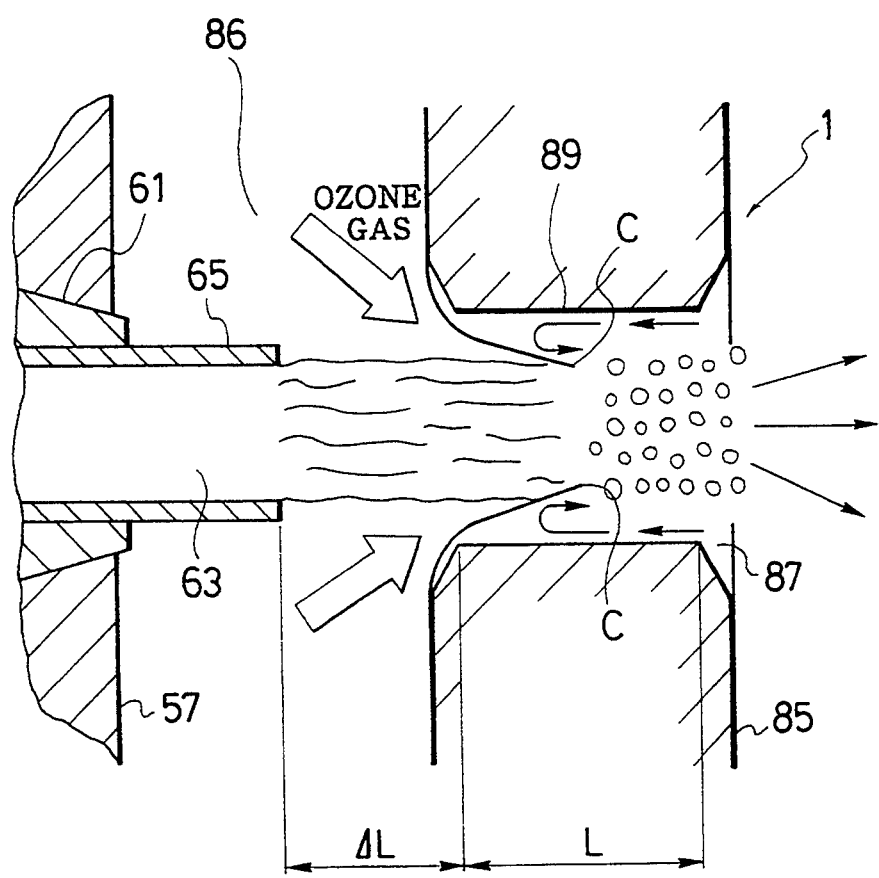
FIG. 5 schematically shows a mechanism for generating fine gas bubbles of the ozone gas through the ejector-type gas nozzle.

Thereafter, the water jet A supplied to the liquid passage 59 of ejector-type gas nozzle 17 is ejected at high speed from the liquid injection hole 63 of nozzle needle 65 to the gas injection hole 87 through liquid nozzle member 61. Then, negative pressure is generated around the stream of water jet A corresponding to the injection speed. As a result, the ozone gas produced by the ozonizer 33 is introduced in the gas suction cavity 86 with its flow amount being measured by the control valve 39. As schematically shown in FIG. 5, the ozone gas introduced into the cavity 86 is sucked in the parallel passage 89 of gas injection hole 87 along the outer periphery of the stream of water jet A. Thereafter, the ozone gas stream is divided into fine gas bubbles near the point C by the stream of water jet A. Then, the so produced gas bubbles are injected into the raw material water A in the ozone reaction tank 1 together with the stream of water jet A.

FIG. 5 schematically shows a mechanism of generating fine gas bubbles of the ozone gas based on the experimental results that we obtained from high-speed photography and microscope observation on a visualized experimental ejector-type gas nozzle with the same structure as the aforementioned ejector-type gas nozzle 17.

If the aimed maximum or equilibrium concentrations of the ozone solution in a plurality of ozone reaction tanks 1 as shown in FIG. 2 are the same, the pressure values predetermined in each ozone gas pressure control valves 49 are adjusted the same to control the ozone gas pressure values in each upper internal spaces 2 (or water pressure values of raw material water A) in the corresponding ozone reaction tanks 1 at the same value, and the flow amounts of pumped ozone gas to be supplied to each of the ejector-type gas nozzles 17 through corresponding pumped ozone gas conduits 29 are adjusted at the same value in each ozone reaction tanks 1 by adjusting the corresponding flow amount control valves 39.

Contrary, if the aimed maximum or equilibrium concentrations of ozone solution to be produced in each ozone reaction tanks 1 are different from each other, the pressure values predetermined in each ozone gas pressure control valves 49 are adjusted to each different desired values to control the ozone gas pressure values in each upper internal spaces 2 (or water pressure values of raw material water A) in the corresponding ozone reaction tanks 1 at each differently aimed values, and the flow amounts of pumped ozone gas to be supplied to each of the ejector-type gas nozzles 17 through corresponding pumped ozone gas conduits 29 are adjusted at each aimed values by controlling the corresponding flow amounts of ozone gas bubbles to be introduced into each ozone gas reaction tanks 1 using each ozone gas small amount control valves 39.

The amount of ozone gas (g/h) to be produced by the ozonizer 33 is sharply increased when the flow amount of raw material gas (Nl/min) passing through the ozonizer is increased. However, the produced ozone gas amount reaches a fixed value when the flow amount becomes a certain value, and is not increased thereafter if the flow amount is further increased. On the other hand, the concentration of ozone gas (ppm) to be produced by the ozonizer 33 is also sharply increased with increase of the flow amount of raw material gas. However, the ozone gas concentration reaches a maximum value before the produced ozone gas amount becomes maximum, and is decreased thereafter with increase of the flow amount of raw material gas.

The amount of ozone gas bubbles or flow amount of pumped ozone gas to be sucked by the ejector-type gas nozzle 17 through the pumped ozone gas conduit 29 and introduced into the ozone reaction tank 1 together with the water jet is increased with increase of the speed of water jet injected from the liquid injection hole 63 of nozzle needle 65 toward the gas injection hole 87.

However, the pumped gas flow amount varies with the physical properties, particularly the surface tension, of water jet A injected from the liquid injection hole 63. The ratio between the flow amount of water jet A and the pumped gas flow amount, i.e., the flow amount ratio, is relatively large (approximately 200%) under the condition of 40 to 50 m/sec water jet speed if the surface tension of water jet A is relatively large. However, it is reduced to about 30% under the condition of 30 to 40 m/sec water jet speed if the water jet A is produced not with water but with an edible oil having lower surface tension.

Accordingly, the size and capacity of ozonizer 33 should be changed by the priority between the maximum ozone gas production amount and the maximum concentration of the produced ozone gas. However, for the actual design, if it is decided that either should be prior, the necessary flow amount of pumped gas can be determined by the number of ejector-type gas nozzles 17 and the kind of water jet A. Therefore, the size and capacity of ozonizer 33 can be so detemined as to leave a suitable margin to the necessary flow amount of pumped gas.

As is shown schematically in FIG. 5, the stream of water jet A injected to the gas injection hole 87 from the liquid injection hole 63 of nozzle needle 65 introduces the ozone gas of the gas suction cavity 86 into the parallel passage 89 of gas injection hole 87 due to the viscosity of the surface of water jet stream to the ozone gas fed in the gas suction cavity 86. However, the flow passage of pumped ozone gas in the parallel passage 89 is gradually narrowed as designated by the solid line in the same drawing. Thus, the ozone gas stream is divided at the distal point C into primary fine gas bubbles due to the relative velocity difference between the water jet stream and the sucked ozone gas stream.

In that case, a portion of the primary fine gas bubbles injected from the gas injection hole 87 will travel in the raw material water A in the ozone reaction tank 1 together with the water jet stream by a distance along which the kinetic energy of the water jet stream is completely extinguished. Thereafter, these bubbles will be combined with one another in a turbulent flow generating area of the water jet stream near the end of the travel and grow into secondary fine gas bubbles having diameters larger than those of primary ones.

However, the generation of such secondary fine gas bubbles can be prevented by throttling the flow amount control valve 39 to reduce the amount of ozone gas to be sucked into the ejector-type gas nozzle 17 through the pumped ozone gas conduit 29.

That is, when the flow amount control valve 39 is throttled to reduce suitably the suction amount of ozone gas to the ejector-type gas nozzle 17, the primary fine gas bubbles are detached from the water jet stream before they reach the turbulent flow generating area, and are then scattered and suspended individually in the raw material water A in the ozone reaction tank 1 without being combined with one another. Therefore, the mechanism of generating the secondary fine gas bubbles can be avoided in such a manner. Accordingly, by the throttling control of the flow amount control valve 39, it becomes possible to obtain only the primary fine gas bubbles having a mean diameter of about 50 $\mu$m to 120 $\mu$m.

Therefore, as mentioned above, more than 80% of the fine ozone gas bubbles Introduced into the raw material water A from the ejector-type gas nozzle 17 have diameters of 10 to 200 $\mu$m, and the mean diameter of all the fine gas bubbles is about 50 to 150 $\mu$m. Thus, the contact surface area of the ozone gas to the raw material water A in the gas-liquid reaction in the ozone reaction tank 1 can be greatly increased because such extremely fine gas bubbles of ozone can be supplied stably and successively into the raw material water A.

Accordingly, the total surface area a of all the gas bubbles in equation (1) is greatly increased so that the amount $Q_z$ of ozone dissolved in the raw material water A per unit time is increased corresponding to the increase of the total surface area a of all the gas bubbles.

If the mean diameter of these fine gas bubbles is 150 $\mu$m, the surface area becomes 400 times the case of gas bubbles having a mean diameter of about 3 mm to be obtained a porous ceramic gas diffuser or the like means, and 900 times if it is 100 $\mu$m. Thus, the amount $Q_z$ of ozone dissolved in the raw material water A per unit time in equation (1) becomes far greater than that value of the prior art. Therefore, even if the flow amount of the pumped gas to be injected as fine gas bubbles into the raw material water A from the ejector-type gas nozzle 17 is much reduced as compared to the flow amount of ozone gas to be sent to the gas diffuser, it is possible to produce an ozone water solution having a higher concentration in a shorter time. In that case, the pressure of water jet A is controlled in the range of about 5 to 10 kgf/cm$^2$G by suitably adjusting the dischaging pressure of pump 19 and operating the water jet pressure control valve 28 so that the speed of water jet stream to be injected into the raw material water A in the ozone reaction tank 1 from the nozzle needle 65 of ejector-type gas nozzle 17 is adjusted to be 20 to 50 m/sec. Since the pressure adjustment of water jet A can be carried out easier than the pressure control of gaseous materials, the injection speed of 20 to 50 m/sec can be obtained with ease even if the pressure of raw material water A in the ozone reaction tank 1 is considerably high. Thus, the desirable fine gas bubbles can be generated stably and successively in large quantities even in the pressurized raw material water A.

On the other hand, in case of the prior art using a plurality of porous ceramic gas diffusers respectively attached to the bottom of the reaction tank, the water pressure in the reaction tank acts directly on these diffusers. Therefore, the pressure for transferring the ozone gas through the system should be increased to overcome the water pressure. Thus, the compressor power must be far larger than the case of adopting the ejector-type gas nozzle.

In addition, as described above, since it is preferred that the water pressure in the reaction tank of this embodiment is elevated by a level within the range of 0 to 3 kgf/cm²G to increase the dissolution amount of ozone gas to the raw material water in the reaction tank, the size of gas bubbles becomes much less than the case of adopting the porous ceramic gas diffuser. Furthermore, since the water jet speed of 20 to 50 m/sec can be assured on producing the fine gas bubbles irrespective of the water pressure in the reaction tank by the method of this invention adopting the ejector-type gas nozzle, it becomes possible more desirable fine gas bubbles can be obtained stably and successively by this method as compared to the prior art.

Next, the relation between the half-life period of the produced high concentration ozone water solution and various factors having some influence thereon will be described based on experimental results. From the experimental results, the condition of producing an ozone water solution presenting an equilibrium concentraion higher than several ppm and a half-life period longer than 5 hours will be determined.

The factors having some influence on a high concentration ozone water solution with a relatively long half-life period are mentioned as follows.

(1) Kind of raw material gas: dried air, pure oxygen
(2) Kind of raw material water: tap water, distilled water, deionized water, electrolyzed water
(3) Temperature of raw material water
(4) pH value of raw material water
(5) Pressure of raw material water
(6) Degree of pressurization of circulated raw material water A in water jet pressure transfer pump 19
(7) Partial pressure of ozone gas reaching upper space 2 of reaction tank 1 without being dissolved in raw material water A Experiment 1

Influence of the kind of raw material water on the equilibrium concentration and the half-life period of dissolved ozone was examined to determine the optimum raw material water.

(1) Raw material gas: dried air
(2) Pressure of water jet from ejector-type gas nozzle: $P_1 = 5$ kgf/cm²G
(3) Flow amount of pumped ozone gas: $Q_g = 250$ ml/min
(4) Concentration of pumped ozone gas: $G_g = 3500$ ppm
(5) Capacity of tank for raw material water: $L = 30$ l
(6) Flow amount of water jet: $Q_L = 300$ ml/min (7) Condition of using ejector-type gas nozzle:
  A) Outer diameter/Inner diameter of nozzle: $d_1/d_2 = 0.8/0.59$ mm
  B) Inner diameter of gas injection hole: $d_g = 1.0$ mm
  C) Length of gas injection parallel passage: $L = 3$ mm
  D) Guzzling thickness $(d_g - d_1)/2$: $\delta_g = 0.1$ mm
  E) Spacing from entrance of gas injection hole to distal end of nozzle needle: $\Delta L = -4$ mm
(8) Pressurization of raw material water or pressurization in space 2: $P = 0$ (open mode)

All of the experimental results on the reation between the concentration of dissolved ozone and time for each raw material water are shown in Table 2.

TABLE 2

| | Experimental condition | | | Time required for reaching the | |
|---|---|---|---|---|---|
| Kind of water | Temperature of water $T_w$ (°C.) | pH value | Equilibrium concentration $C_{Lm}$ (ppm) | equilibrium concentration t (min) | Half-life period $t_h$ (min) |
| Tap water | 6 | 7 | 1.40 | 180 | 262 |
| | 10 | | 0.85 | 130 | 152 |
| | 13 | | 0.78 | 120 | 152 |
| | 16 | | 0.52 | 120 | 69 |
| | 20 | | 0.38 | 70 | 40 |
| Electrolyzed water | 13 | 3 | 0.90 | 220 | 386 |
| | | 5 | 0.78 | 160 | 402 |
| | | 6 | 0.90 | 150 | 138 |
| | | 7 | 0.96 | 230 | 142 |
| | | 9 | 0.98 | 360 | 158 |
| | | 11 | 0.00 | — | — |
| Tap water | 13 | 7 | 0.78 | 120 | 152 |
| Electrolyzed water | | | 0.96 | 230 | 142 |
| Distilled water | | | 0.58 | 290 | 657 |
| Deionized water | | | 0.86 | 220 | 881 |

From the above experimental results, combinations of raw material water, temperature and pH value for satisfying the desirable half-life period longer than 5 hours are determined as follows.

Electrolyzed water, 13° C., pH 3 or 5: $t_h \approx 6.5$ hours
Distilled water, 13° C., pH 7: $t_h \approx 11$ hours
Deionized water, 13° C., pH 7: $t_h \approx 14.7$ hours With respect to the solubility of ozone gas to the raw material water, there can be applied Henry's law that the amount of a gaseous-body which can be dissolved in a fixed amount of liquid at fixed temperature is in proportion to the pressure of the gaseous body. On the other hand, if air containing ozone at a certain concentration (Y) is exposed to water (distilled water) under fixed pressure, the dissolution amount (C) of the air in the water can be expressed by the following equation (2) as a function of temperature $(T_w)$.

$$C = \{0.604(1 + T_w/273)Y\}/(1 + 0.063 T_w) \qquad (2)$$

From these theorems, it can be understood that the solubility of ozone to the raw material water is increased in proportion to the pressure of ozone gas or the pressure of raw material water in the reaction tank in which the ozone gas bubbles are introduced, and if the pressure value is fixed, it becomes higher with increase of the temperature of raw material water.

As is seen from the experimental results in Table 2, the equilibrium concentration of the produced ozone water solution in case of using dried air as the raw material gas is about 1 ppm. However, it can be apparently understood that the equilibrium concentration of the produced ozone gas will be greatly increased higher than 2 ppm by pressurizing the raw material water A in the ozone reaction tank 1 by introducing a portion of the produced ozone gas into the space 2 through the conduit 47 divided from the ozone gas distributing conduit 46.

Thus, considering the experimental results in Table 2 in case of using dried gas as the raw martial gas and these theorems, the factors, kind of raw material water, pH value, temperature and pressure of water, which can satisfy the condition for assuring the half-life period longer than 5 hours are determined in several combinations as shown in Table 3.

TABLE 3

(Condition of producing ozone water solution (Half-life period ≧ 4~5 hours))

| Raw material water | Temperature of water | pH value | Pressurization to water (kgf/cm$^2$) |
|---|---|---|---|
| Electrolyzed water | 5~15 | 2~5.5 (acidic) | 0~3 |
| Distilled water | 5~15 | 7 (neutral) | 0~3 |
| Deionized water | 5~15 | 7 (neutral) | 0~3 |

Of the kinds of raw material water shown in Table 3, the distilled water and deionized water are used in the fields permitting a relatively high cost of ozone solution, such as sterilization of medical appliances or sterilization of raw material water or processing water of semiconductor manufacturing factories, and the electrolyzed water with pH of about 2.5 to 5 is used for usual sterilization, deodorization and bleaching.

Table 4 shows examples of using the ozone water solution for foods in more detail than Table 1.

TABLE 4

(Examples of utilizing ozone for foods)

| Purposes | Fields of utilization |
|---|---|
| Sterilization (foods) | Raw materials of foods |
| | Cereals, beans and the like powdered materials |
| | Vegetables and fruits |
| | Japanese-style confections or western-style cakes |
| | Fresh fish and meat |
| | Raw oysters and daily household dishes |
| Sterilization (environment and air) | Factories of Japanese-style or western style confections |
| | Marine or livestock processing factories |
| | Refrigerators |
| | Low-temperature storehouses |
| | Restaurants and cookrooms |
| | Super markets (sections of primary products) |
| | Bean curd (tofu) processing factories |
| | Frozen food processing factories |
| | Broiler factories |

TABLE 4-continued (Examples of utilizing ozone for foods)

| Purposes | Fields of utilization |
|---|---|
| Sterilization (water) | Water for processing foods |
| | Cleaning water (for foods and vessels) |
| | Treatment of water (for drainage) |
| | Water spray for foods |
| Deodorization and bleaching | Meat processing places |
| | Cookrooms |
| | Factories of processing daily household dishes |
| | Feeding facilities |
| | Deodorization and bleaching or raw materials of foods |
| | Hotels, super markets and department stores |
| Oxidization and other actions | Decomposition of detrimental gases |
| | Promotion of ripening raw materials of foods |
| | Growth promotion of plants |

As is seen from Table 4, the most important effect of the ozone water solution is the bactericidal action. Table 5 shows the relation between the bactericidal effect and the concentration of ozone water solution.

TABLE 5

(Inactivating action of ozone water solution to microbes)

| Kind of bacteria | Ozone concentration in water (ppm) | Density of bacteria (cells/ml) | Temperature (°C.) | pH | Contact time | Extinction rate (%) |
|---|---|---|---|---|---|---|
| Coliform bacillus | 0.96 | $10^5$ cells | 21.0 | 7.0 | 5 sec | 100 |
| Staphylococcus | 1.08 | $10^5$ cells | 21.0 | 7.0 | 5 sec | 100 |
| Pseudomonas aeruginosa | 1.04 | $10^5$ cells | 21.0 | 7.0 | 5 sec | 100 |
| Clostridium perfringens | 0.96 | $10^5$ cells | 21.0 | 7.0 | 5 sec | 100 |
| Influenza virus | 0.96 | $10^{5.3}\text{EID}_{50}$ | 21.0 | 7.0 | 5 sec | 100 |
| Chicken cerebrospinal myelitis virus | 0.72 | $10^{2.9}\text{EID}_{50}$ | 20.0 | 7.0 | 5 sec | 100 |
| Dog infectious hapatitis virus | 1.20 | $10^{1.5}\text{TCID}_{50}$ | 21.0 | 7.0 | 5 sec | 100 |
| Dog parvovirus | 0.96 | $10^{2.5}\text{TCID}_{50}$ | 21.0 | 7.0 | 5 sec | 100 |
| Chicken coccidium | 1.92 | $3 \times 10^3$ cells | 20.0 | 7.0 | 30 minute | 100 |

As is seen from Table 5, if the concentration of ozone is about 1 ppm, almost all of the bacteria and viruses are killed at the 100% extinction ratio immediately or in the contact time of only 5 seconds. Accordingly, to enjoy such a sterilizing action completely even after passage of the half-life period longer than 5 hours, it is preferred to adjust the concentration of the produced ozone solution higher than 2 ppm. Furthermore, in the case of requiring the ozone concentration to be 1 to 1.5 ppm even after passage of 10 hours, the concentration of the produced ozone solution must be adjusted at about 3 to 5 ppm as a minimum. Accordingly, to produce such a high concentration ozone water solution, it is preferred to use pure oxygen rather than dried air as the raw material gas.

Thus, in the following experiments, (4) pH value of the raw material water, (5) pressure of the raw material water, (6) pressurization of the water jet in the pressure transfer pump and (7) partial pressure of the ozone gas in the upper space of the ozone reaction tank of the aforementioned factors (1) to (7) were examined using pure oxygen as the raw material, gas.

Experiment 2

Influence of pH of the raw material water on the production and half-life period of the high concentration ozone water solution was examined.

That is, influence of pH of electrolyzed water on the ozone concentration and half-life period of the produced ozone water solution was examined using four kinds of electrolyzed water respectively having pH values of 2 to 9 and produced by an electrolyzed-water producing apparatus under the condition shown in Table 6.

TABLE 6

| Raw material gas | Oxygen | | | |
|---|---|---|---|---|
| Supply flow amount Qo (l/min) | 2.0 | | | |
| Concentration of ozone gas Cg (ppm) | 6000 | | | |
| Solvent | Electrolyzed water | | | |
| Amount of water (l) | 30 | | | |
| Temperature of water Tw (°C.) | 20.0 | | | |
| pH value | 2.5 | 4.8 | 6.3 | 8.3 |
| Pressure in the reaction tank Pi (kgf/cm$^2$G) | 0 | | | |
| Pressure of jet liquid P$_L$ (kgf/cm$^2$) | 5.0 | | | |
| Flow amount of suction gas Qg (ml/min) | 500 | | | |
| Flow amount of jet liquid Q$_L$ (ml/min) | 480 | | | |
| Flow amount of by-pass liquid Q$_B$ (ml/min) | 0 | | | |

Figure 6:
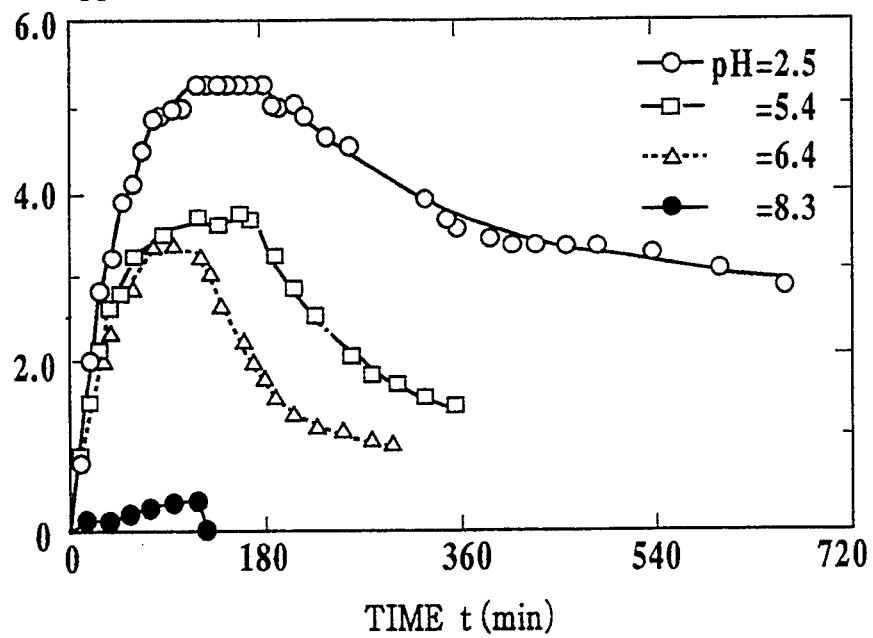
FIG. 6 is a graph showing relation between the concentration of the ozone water solution and time for pH of electrolized water.
Figure 7:
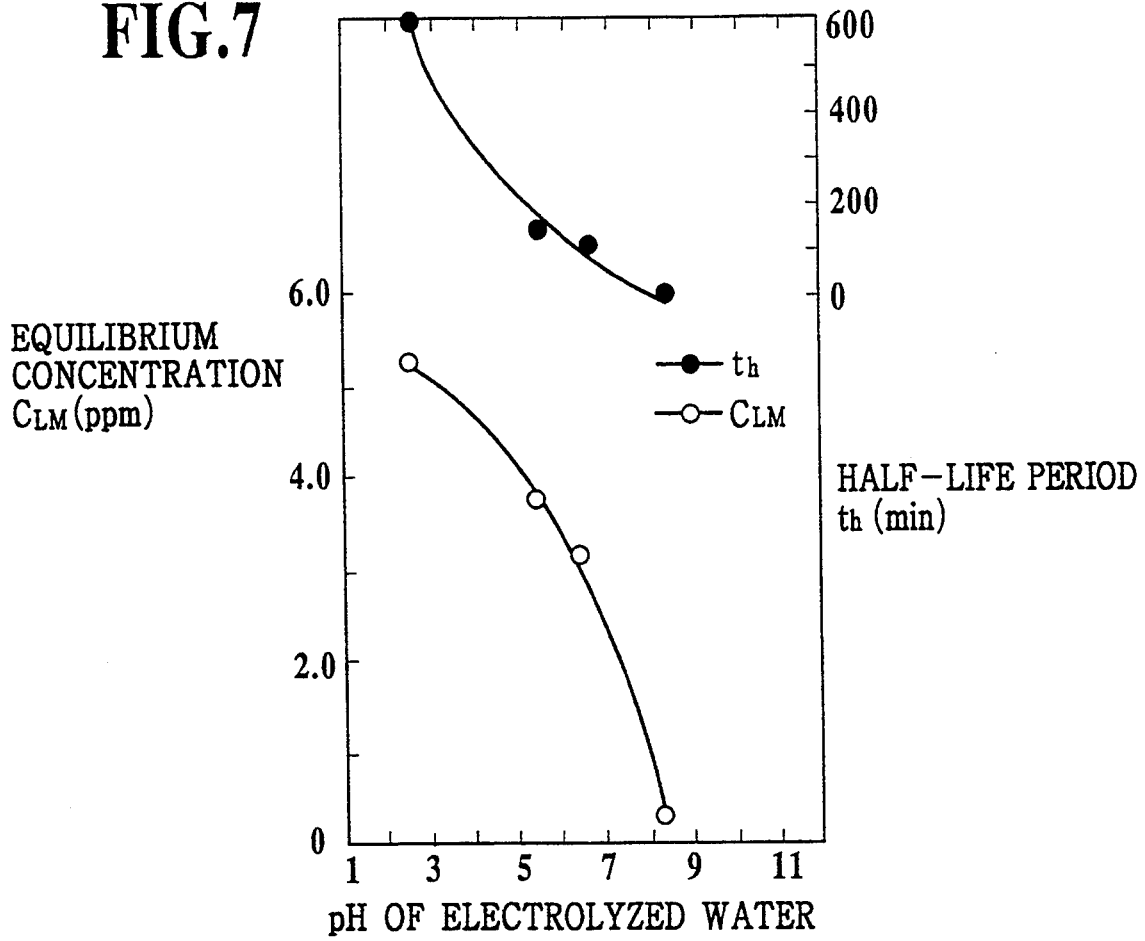
FIG. 7 is a graph showing relation between the equilibrium concentration of the ozone water solution and a half-life period for pH of electrolized water.

As is seen from the experimental results shown in FIGS. 6 and 7, if the pH value of electrolyzed water is lowered to increase the acidity, the maximum (equilibrium) concentration $C_{Lm}$(ppm) of the dissolved ozone is elevated so that the half-life period $t_h$(min) is much increased. Namely, when the pH value is 2.5, as shown by the experimental results in Table 7, the maximum concentration $C_{Lm}$ exceeds 5 ppm, and the half-life period is about 10 hours, irrespective of relatively high temperature (20° C.) of the raw material water.

TABLE 7

| pH | Equilibrium Concentration $C_{Lm}$ (ppm) | Time required for reaching the equilibrium concentration t (min) | Half-life period $t_h$ (min) |
|---|---|---|---|
| 2.5 | 5.25 | 120 | 591 |
| 4.8 | 3.70 | 120 | 133 |
| 6.3 | 3.20 | 70 | 108 |
| 8.3 | 0.30 | 90 | <10 |

From the above experimental results, in case of using electrolyzed water as the raw material water, it was proved that the higher acidity of electrolyzed water provides the higher concentration ozone water solution and the longer half-life period.

Further, the experimental results showing that such low pH electrolyzed water can sharply lengthen the half-life period of the ozone water solution also designates the fact seen from the aforementioned experimental results in Table 2 of Experiment 1 where dried gas was used in the raw material gas.

Experiment 3

Influence of the pressure of raw material water on increase of the ozone concentration and extension of the half-life period was examined.

In this experiment, tap water was used as the raw material water, and three types of pressurization modes in the reaction tank 1, $P_L$=0, 0.5 and 1.0 kgf/cm$^2$G, were conducted. The factors concerning the ejector-type gas nozzle 17, such as water amount in ozone reaction tank 1, water temperature $T_w$, liquid injection pressure $P_L$ and flow amount $Q_g$ of the pumped gas, were the same as the case of Experiment 2 shown in Table 6. The liquid injection pressure of $P_L$=0 kgf/cm$^2$G was established by closing the valve 48 attached to the produced ozone gas conduit 47 and removing the top wall or cover of ozone reaction tank 1. Further, $P_L$=0.5 and 1.0 kgf/cm$^2$G were achieved respectively by opening the valve 48 with the cover of reaction tank 1 being closed and supplying portion of the produced ozone gas divided from the ozone gas distribution conduit 46 to the space 2 so as to pressurize the raw material water A in the reaction tank 1. In that case, the pressure was controlled by the ozone gas pressure automatic control valve 49 provided in the ozone gas exhaust conduit 50 at 0.5 and 1.0 kgf/cm$^2$G, respectively.

Figure 8:
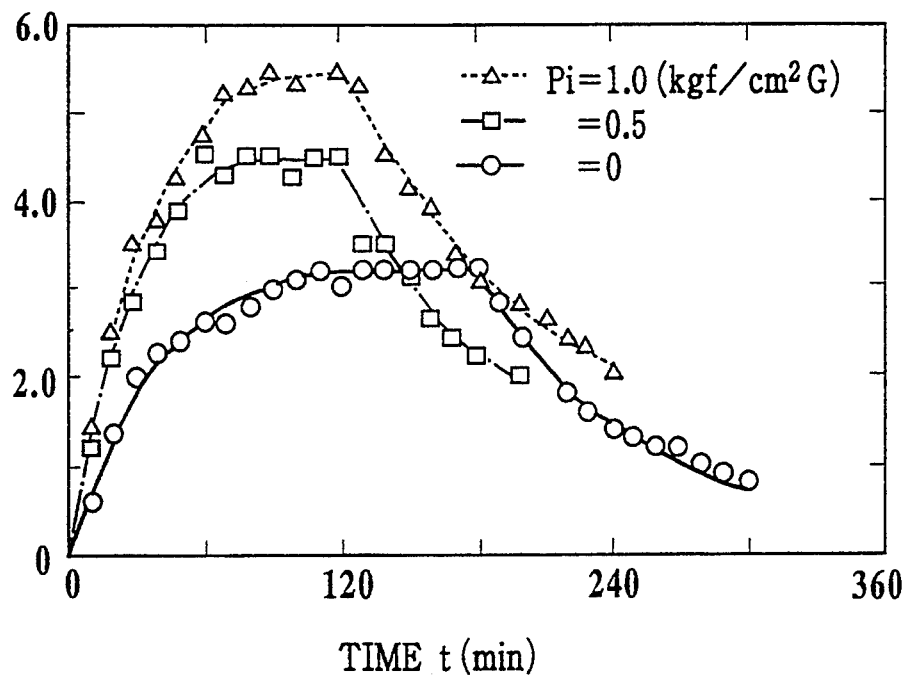
FIG. 8 is a graph showing relation between the concentration of the ozone water solution and time for pressure of the raw material water.

As is seen from FIG. 8 and Table 8, the ozone concentration is increased by elevating the pressure of the produced ozone gas to be fed in the pressurization space 2 defined by the upper portion of ozone reaction tank 1. That is, the equilibrium concentration of the water solution exceeds 5 ppm under such condition irrespective of using relatively high temperature (20° C.) tap water as the raw material water. In addition, the half-life period of the solution is also extended by pressurizing the raw material water in the reaction tank.

However, in case of such pressurization of raw material water in the reaction tank, though the effect of increasing the ozone concentration of raw material water is considerably great, the extension effect on the half-life period is insufficient.

TABLE 8

| Pressurization in the reaction tank Pi (kgf/cm$^2$G) | Equilibrium Concentration $C_{Lm}$ (ppm) | Time required for reaching the equilibrium concentration t (min) | Half-life period $t_h$ (min) |
|---|---|---|---|
| 0 | 3.20 | 110 | 62 |
| 0.5 | 4.50 | 60 | 69 |
| 1.0 | 5.33 | 80 | 86 |

Experiment 4

Influence of pressurization of the circulating raw material water by the pressure transfer pump on increase of the ozone concentration and extension of the half-life period was examined.

TABLE 9

| Solvent | Tap water | | |
|---|---|---|---|
| Amount of water (l) | 30 | | |
| Temperature of water Tw (°C.) | 20.0 | | |
| Pressurization in the reaction tank Pi (kgf/cm$^2$) | 0 | | |
| Pressure of jet liquid P$_L$ (kgf/cm$^2$) | 2.5 | | |
| Flow amount of suction gas Qg (ml/min) | 250 | | |
| Flow amount of jet liquid Q$_L$ (ml/min) | 0 | 300 | 300 |
| Flow amount of by-pass liquid Q$_B$ (ml/min) | 300 | 0 | 300 |

The change of ozone concentration in the ozone solution was investigated by changing the total flow amount ($Q_L$+$Q_B$) in the pressure transfer pump 19. In that case, both the flow amount $Q_L$ of water jet from ejector-type gas nozzle 17 and the flow amount $Q_g$ of pumped ozone gas were kept constant, and the flow amount $Q_B$ of by-pass liquid to be returned into the ozone reaction tank 1 through the water jet return conduit 27 was changed as shown in Table 9. Also, to examine the effect of increasing the ozone concentration by the water jet from the ejector-type gas nozzle 17, the case in which the water jet is injected by the ejector-type gas nozzle 17 and the case in which not injected thereby were compared to each other.

Figure 9:
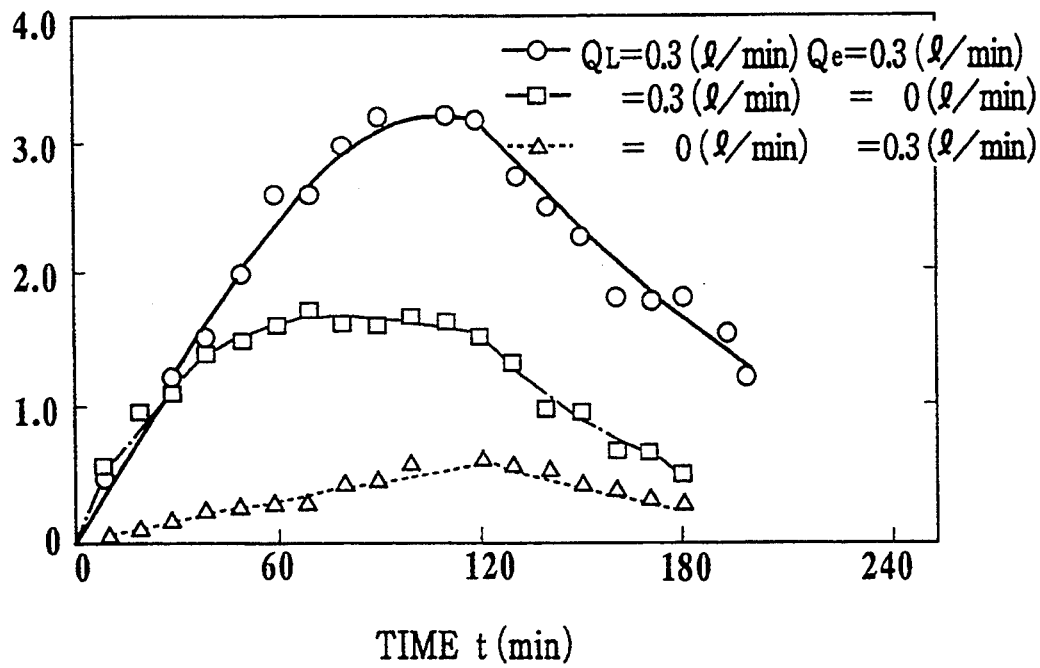
FIG. 9 is a graph showing influence of the pressure of the raw material water by the pump on the concentration of the ozone water solution.

As shown in FIG. 9 and Table 10, the equilibrium concentration of the ozone water solution was minimum (0.6 ppm) in case of $Q_L$=0 and $Q_B$=300 ml/min, while the value was increased to 1.60 ppm in case of $Q_L$=300 ml/min and $Q_B$=0 ml/min or when the flow amount of by-pass liquid is 0 and all of the liquid flow in the pressure transfer pump is injected by the ejector-type gas nozzle 17.

The equilibrium concentration was further increased to 3.20 ppm when the flow amount in the pressure transfer pump was increased to 600 ml/min and was then divided into $Q_L=300$ ml/min and $Q_B=300$ ml/min. This is because the fine ozone gas bubbles suspended in the reaction tank 1 are pressurized by the pump 19 when sucked therein to be dissolved in the raw material water. However, the pressurization of raw material water in the pressure transfer pump is not so effective for extending the half-life period of the ozone concentration as for elevating the equilibrium concentration.

| Partial pressure of ozone gas $P_{O3}$ (kPa) | Equilibrium Concentration $C_{Lm}$ (ppm) | Time required for reaching the equilibrium concentration t (min) | Half-life period $t_h$ (min) |
|---|---|---|---|
| 0.1 | 0.20 | 140 | 20 |
| 0→0.4 | 2.00 | 100 | 92 |
| 0.6 | 2.40 | 100 | 77 |

From the experimental results obtained in each of Experiments 1 to 5, there can be mentioned as follows the factors having good influence on increase of the equilibrium concentration and extension of the half-life period of the ozone water solution.

TABLE 10

| Flow amount of jet liquid $Q_L$ (ml/min) | Flow amount of by-pass liquid $Q_B$ (ml/min) | Equilibrium Concentration $C_{Lm}$ (ppm) | Time required for reaching the equilibrium concentration t (min) | Half-life period $t_h$ (min) |
|---|---|---|---|---|
| 0 | 300 | 0.60 | 120 | 46 |
| 300 | 0 | 1.60 | 60 | 38 |
| 300 | 300 | 3.20 | 90 | 65 |

Experiment 5

Influence of the partial pressure of ozone gas in the pressurizing space 2 on the ozone concentration and the half-life period of the ozone water solution was examined.

In this experiment, the by-pass flow amount $Q_B$ through the water jet return conduit 27 of ejector-type gas nozzle 17 was fixed at 0 ml/min, and the flow amount of raw material water through the pressure transfer pump 19, that is, the flow amount $Q_L$ of water jet from the ejector-type gas nozzle 17 was fixed at 300 ml/min. Further, the concentration of ozone gas in the space 2 defined by the upper space of ozone reaction tank 1 was subjected to three-step adjustment within the range of 1000 to 6000 ppm. In that case, the pressure in the space 2 is kept at the atmospheric pressure by opening the automatic ozone gas pressure control valve 49 attached to the ozone gas exhaust conduit 50. The factors other than those mentioned above, such as water temperature, water amount and pressure in the reaction tank, were completely the same as those in Table 9 of Experiment 4.

Figure 10:
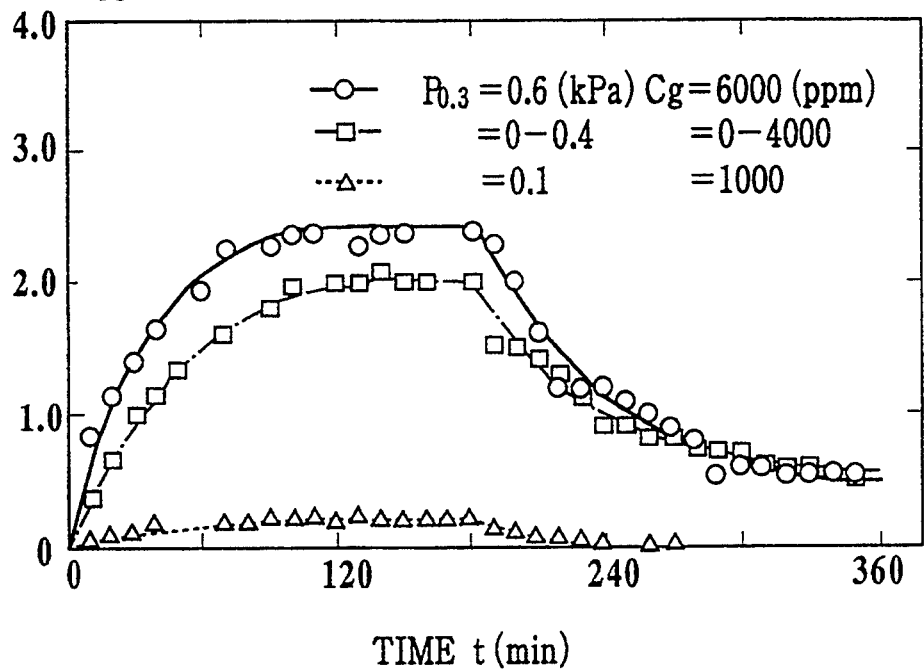
FIG. 10 is a graph showing influence of the partial pressure of ozone gas on the concentration of the ozone water solution.

Of the partial pressure values of ozone gas shown in FIG. 10, $P_{O3}=0\to0.4$ KPa ($4\times10^{-3}$ kgf/cm$^2$G) means that no ozone gas was fed first in the space 2, and the ozone gas bubbles injected into the reaction tank from ejector-type gas nozzle 17 then rose in the raw material water A without being dissolved therein, so that the partial pressure of ozone gas in the space 2 was gradually increased. Further, $C_g=0\to4000$ ppm of the ozone gas concentration means the change corresponding to the gradual increase of the partial pressure.

As is seen from the experimental results in FIG. 10 and Table 11, the higher partial pressure of ozone gas in the space 2 can provide the higher concentration of the ozone water solution, the shorter time required for reaching the equilibrium concentration and the longer half-life period. However, similar to the case of pressurization effect in the pressure transfer pump in Experiment 4, the increase of the partial pressure of ozone gas is expectable for elevating the equilibrium concentration of the ozone water solution, but can not be considered as important factor for extending the half-life period.

(1) Raw material gas

By using oxygen gas as the raw material gas, the ozone gas concentration can be increased 2 to 3 times the case of using dried air. Thus, the equilibrium concentration of the ozone water solution can be increased so much.

(2) Temperature of raw material water

Lowering the temperature of raw material water is effective both for increasing the equilibrium concentration and for extending the half-life period.

(3) pH of raw material water

Lowering the pH value of solvent is markedly effective both for increasing the equilibrium concentration and for extending the half-life period. In particular, in the case of pH 2.5, the equilibrium concentration exceeded 5 ppm, and the half-life period was about 10 hours, irrespective of relatively high water temperature (20° C.).

(4) Pressure in the reaction tank

The pressurization in the reaction tank leads to elevation of the partial pressure of ozone gas, thereby to elevate the equilibrium concentration of the ozone water solution. In the above experiment, in spite of using tap water as the raw material water, the equilibrium concentration exceeded 5 ppm. In addition, the half-life period was also extended by pressurizing the interior of the reaction tank.

Experiment 6 (Overall test)

Based on the above experimental results, the overall test was done with respect to the aforementioned factors having good influence both on increase of the equilibrium concentration and on extension of the half-life period of the ozone water solution. That is, as shown in Table 12, using electrolyzed water of temperature $T_w=12°$ C. and pH 2.8 as the raw material water or solvent, the ozone gas pressure in the upper space 2 of reaction tank 1 was adjusted at $P_L=1.0$ kgf/cm$^2$G by operating the automatic ozone gas control valve 49.

TABLE 12

| | |
|---|---|
| Raw material gas | Oxygen |
| Supply flow amount $Q_0$ (l/min) | 2.0 |
| Concentration of ozone gas $C_g$ (ppm) | 6000 |
| Solvent | Electrolyzed water |
| Amount of water (l) | 30 |

TABLE 12-continued

| | |
|---|---|
| Temperature of water Tw (°C.) | 12 |
| pH value | 2.8 |
| Pressure in the reaction tank Pi (kgf/cm$^2$G) | 1.0 |
| Pressure of jet liquid P$_L$ (kgf/cm$^2$) | 5.0 |
| Flow amount of suction gas Qg (ml/min) | 500 |
| Flow amount of jet liquid Q$_L$ (ml/min) | 480 |
| Flow amount of by-pass liquid Q$_B$ (ml/min) | 480 |

This experiment cosists of two parts (A) and (B). In Experiment (A), the pressure transfer pump 19 was stopped after detection of the concentration of the ozone solution reaching 14 ppm as the equilibrium concentration by measuring it at 10-minute intervals so as to stop injection of the water jet and pumped gas from the ejector-type gas nozzle 17 into the raw material water A, and the gas small amount control valve 39 was closed at the same time. Thereafter, ozone gas introduced into the produced ozone gas distribution conduit 46 was fed in the upper space 2 of ozone reaction tank 1 from the produced ozone gas introducing conduit 47. The pressurization in the space 2 was kept at 1 kgf/cm$^2$G by the control of automatic ozone gas pressure control valve 49 attached to the ozone gas bleed conduit 50. Thus, the raw material water A was subjected to the same pressurization by the produced ozone gas. Curve (A) in FIG. 11 designates the change with time of concentration in the ozone water solution.

TABLE 13

| Kind of experiments | Equilibrium Concentration C$_{Lm}$ (ppm) | Half-life period t$_h$ (Hr) |
|---|---|---|
| A | 14.0 | 65 |
| B | 14.0 | longer than 10 hours |
| | ↓ 7.0 | longer than 20 hours |

The concentration of ozone water solution is reduced exponentially with time due to self decomposition of ozone. Thus, the half-life period t$_h$ can be expressed by equation (3).

$$t_h = \ln 2/K = 0.693/K \qquad (3)$$

Figure 11:
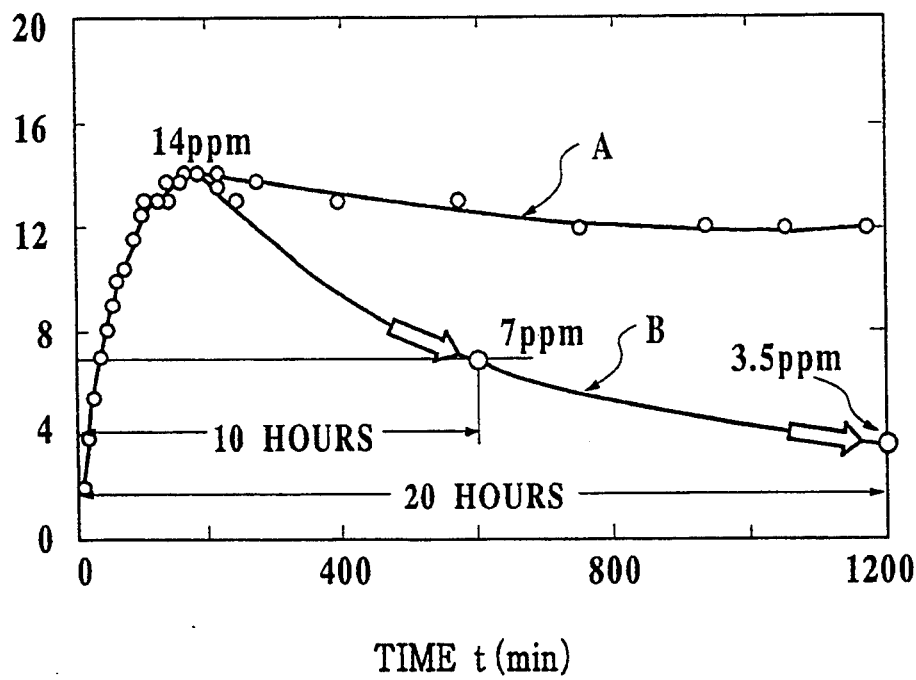
FIG. 11 is a graph showing change of the concentration of the ozone water solution with time and its half-life period found by an overall experiment.

The value of K in equation (3) is the so-called kinematic constant, and is determined in FIG. 11 by the gradient of the straight line showing the relation between the time passage of the horizontal axis and the logarithmic value of the concentration of ozone water solution of the vertical axis after the equilibrium reaching 14.0 ppm. Then, the so-obtained value of K is used in equation (3) to determine t$_h$.

As shown in Table 13, the half-life period of Experiment (A) is extremely long (65 hours). Therefore, th was determined by introducing in equation (3) the value of K calculated as described above based on the experiment data obtained over 20 hours as shown in FIG. 11.

On the other hand, in Experiment (B), all the system of the ozone solution producing apparatus was stopped after the concentration of raw material water A reaching the equilibrium concentration of 14.0 ppm to stop the production of ozone water solution. Then, the upper space 2 of ozone reaction tank 1 was opened to make the internal pressure equal to the atmospheric pressure. In that state, the ozone concentration of ozone water solution to be reduced exponentially with time was measured. Thereafter, the value of K was determined in the same manner as described above from the measured concentration values, and the half-life period t$_h$ was then calculated by introducing the value of K into equation (3).

As a result, the value of K was estimated to be $1.14 \times 10^{-3}$ based on FIG. 11 and partly on FIG. 6. Then, the half-life value t$_h$ was calculated to be 608 minutes.

Consequently, as is seen apparently from FIG. 11 and Table 13, the half-life period t$_h$ of 65 hours in Experiment (A) is so long that it is impossible for any related prior art to achieve that length. The primary reason is that the exponential reduction with time of the ozone concentration due to self decomposition of ozone in the produced ozone water solution in the reaction tank 1 after reaching the equilibrium concentration of 14.0 ppm is seemingly suppressed by dissolution of the ozone gas in the space 2 into the ozone water solution aided by the pressurization in the same space with the same gas.

In case of Experiment (B), the ozone concentration of the ozone water solution is gradually decreased in a substantially exponential mode also by self decomposition of ozone. However, as shown in FIG. 11, the half-life period is relatively long (longer than 10 hours) even without enjoying the ozone supplementation as provided in Experiment (A). Further, the concentration of ozone water solution at the half-life period is relatively high (about 7.0 ppm). In addition, the concentration value is still retained near 3.5 ppm even at the next half-life period (20 hours later after the start of experiment). Accordingly, the ozone solution obtained by this case can retain a practically effective ozone concentration for presenting desirable sterilizing, deodorizing and bleaching actions.

As described above, the apparatus of this invention in case of using dried gas as the raw material gas can provide an equilibrium concentration of the ozone water solution within the range of 2 to 4 ppm and a half-life period of the solution longer than 5 hours. On the other hand, in case of using pure oxygen as the raw material gas, the equilibrium concentration can be increased to the range of 4 to 14 ppm, and the half-life period becomes longer than 8 hours, if the additional means of further extending the half-life period is provided in the apparatus as mentioned above, it can be unprecedentedly extended (about 10 hours), thereby obtaining an ozone water solution having a high concentration and a long half-life period highly effective for sterilization, deodorization and bleaching (see Tables 1 and 14).

Further, as is seen from Table 14 collecting all the experimental data of Experiments 1 to 6, it becomes possible to control the equilibrium concentration and half-life period of the ozone water solution at any aimed values respectively by combining the factors having considerable influence thereon. For example, the combination of the equilibrium ozone concentration in the range of 5 to 6 ppm and the half-life period longer than 10 hours can be achieved by determining the amounts of several factors shown in Table 2 respectively having some positive effect for increasing the equilibrium concentration.

In general, as is seen from Tables 1 and 4, effective sterilizing, deodorizing and bleaching actions can be assured in almost all of the related fields if the concentration of the ozone water solution is about 1 ppm. Therefore, even in case of the ozone solution containing 2 to 4 ppm ozone which is produced by the inventive method using dried air as the raw material gas, those actions still remain effective even after passage of 5 hours as the half-life period. In particular, in the case of using pure oxygen as the raw material gas, the concentration of ozone water solution is still higher than several ppm even after passage of 5 hours as the half-life period. Thus, the ozone water solution produced with the pure oxygen can perform 100% sterilization against bacteria and viruses likely to be generated in particular in the field of foods as shown in Table 4.

than 4 ppm and using pure oxygen as the raw material gas. Therefore, by controlling the variously possible half-life periods and the ozone concentration values at the point of time, the ozone water solution produced by the present invention be useful enough in all of the fileds shown in Table 1. As the apparatus for producing the ozone water solution, the apparatus of batch type as

TABLE 14

| Raw material gas | Raw material water | pH value | Temperature of water $T_w$ (°C.) | Pressurization to water $P_i$ (kgf/cm$^2$G) | Pressurization in the pump | Partial pressure of ozone gas | Equilibrium concentration $C_{Lm}$ (ppm) | Half-life period $t_h$ (min) |
|---|---|---|---|---|---|---|---|---|
| Dried air | Electrolyzed water Distilled water Deionized water | 2~5.5 (Acidic) 7 (Neutral) | 3~15 | 0~3 | Raw material water was processed in a circulating manner comprising suction → pressurization → injection using a pressure transfer pump. | Partial pressure of ozone gas in the puressurization space was used effectively | 2~4 ppm | longer than 5 hours |
| Pure oxygen | Electrolyzed water | 2~5.5 | 3~15 | 0~3 | | | longer then 4 ppm | longer than 8 hours |
| | Distilled water Deionized water | 7 | | | | | | longer than 10 hours |
| Preferable condition | Electrolyzed water Distilled water Deionized water | 2~5.5 7 | 6~12 | 0.5~1.5 | Raw material water was processed in a circulating manner comprising suction → pressurization → injection using a pressure transfer pump. | Partial pressure of ozone gas in the puressurization space was used effectively | | |
| Effect | | | | | | | | |
| Increase of equilibrium concentration | -- | | | ○ | | ○ | | |
| Extension of half-life period | | | ○ | △ | X | | X | |

: Markely effective
○: Effective
△: Slightly effective
X: Ineffective

1. In the light of cost, it is preferred to use electrolyzed water for general uses. Distilled water and deionized water are suitable for uses, such as sterilization and deodorization of medical appliances and medical waste or processing of raw materials in semiconductor factories, in which a relatively high cost to be caused by the ozone water solution can be allowed to some extent.

As is seen apparently from Table 14, the concentration of the ozone water solution can be extended longer than 10 hours by using distilled water or deionized water as the raw material water. The use of ozone water solution produced using distilled water or deionized water as the raw material water is limited because the production cost of the raw material water is much higher than the case of using electrolyzed water. However, the so-high-cost ozone water can be used in complete sterilization of mechanical appliances, sterilization and deodorization of mechanical waste, or sterilization and purification of cleaning water in the semiconductor manufacturing field, in which a high concentration ozone water having a significantly long half-life period should be required irrespective of its relatively high cost.

However, in the light of applicability to low cost and mass production, the high concentration ozone water solution produced using electrolyzed acidic water of pH 2 to 5.5 is the most useful. Even in this case, it is possible to produce a high concentration ozone water solution having a half-life period longer than 5 hours in case of the equilibrium concentration of 2 to 4 ppm and using dried air as the raw material gas. In addition, it is also possible to realize a half-life period longer than 8 hours in case of the equilibrium concentration higher shown in FIGS. 1 and 2 is the most suitable. However, it is also possible to use a series of apparatus for producing an ozone water solution in series.

For the ozone-solution producing apparatus shown in FIGS. 1 and 2, a plurality of ozone reaction tanks 1 may be used for the mass-production of high concentration ozone water solution having the same ozone concentration. Of course, it is also possible to produce high concentration ozone water solution having each different ozone concentration by the respective ozone reaction tanks 1.

The capacity of ozone reaction tank 1 may be changed corresponding to the necessary amount of high concentration ozone water Solution. In the overall experiment shown in Table 12, as is seen from the experimental data in FIG. 11, the concentration of ozone water solution reached 14.0 ppm at the point of 180 minutes. At this time, the pressure of water jet from ejector-type gas nozzle 17 and the flow amount of pumped gas were $P_L=5$ kgf/cm$^2$G, $Q_g=500$ ml/min, respectively. Further, when $P_L$ was increased twice (10 kgf/cm$^2$G), $Q_g$ became about 2.2 times (1100 ml/min). Considering these facts together with other experimental data, it can be understood easily that if $P_L$ is increased to 8 to 10 kgf/cm$^2$G, the equilibrium concentration reaches 14.0 ppm in the time range of 120 to 150 minutes.

As shown in the experimental condition of Table 12, the capacity of ozone reaction tank 1 for receiving electrolyzed water in this experiment was 30 liters, and the flow amount $Q_g$ of pumped gas was 500 ml/min. Thus, the unit flow amount of pumped gas per 1 liter of the capacity was 16.7 ml/min.

Accordingly, assume now that the unit flow amount is 20 ml/min. l as standard design value. That is, under such standard design condition, it is also possible to suppress generation of the aforementioned secondary fine gas bubbles by throttling the gas flow amount control valve 39.

if the designed capacity of ozone reaction tank 1 is 200 liters, and the flow amount of pumped ozone gas $Q_g$ is 1000 ml/min, the unit flow amount of pumped gas becomes 4 ml/min. l. Thus, the number of ejector-type gas nozzles 17 needed is four.

Further, if $Q_g$ is reduced to 700 ml/min. l to completely prevent the generation of the secondary fine gas bubbles and produce only the primary fine gas bubbles having the mean diameter of about 100 μm by throttling the valve 39, the number of ejector-type gas nozzles 17 necessary for satisfying the standard design value of 20 ml/min. l will be six. The attachment of these gas nozzles 17 to the ozone reaction tank 1 may be carried out as mentioned above. For example, if six gas nozzles 17 are provided in the reaction tank, three of them may be attached to the upper portion of the tank at the same angular interval, and the remained to the lower portion in the same manner. Thus, the number and arrangement of ejector-type gas nozzles 17 can be determined optionally corresponding to the capacity and configuration of the ozone reaction tank 1.

In Experiment 6, an air-cooling type cylindrical ceramic ozonizer was used as ozonizer 33 for achieving the flow amount ($Q_1 = 2.0$ l/min) of oxygen to be supplied to the ozonizer and the concentration ($C_g = 6000$ ppm) of the produced ozone gas as shown in Table 12. The ozonizer of this type is a so-called silent discharge type ozonizer which is widely used because of its relatively low power consumption and excellent reliability. However, other high-performance ozonizers, such as a volume discharge type or a creepage discharge type using high-purity alumina ceramic, may be also used as the ozonizer in this experiment. Further, a gas cylinder of pure oxygen of the laboratory level was used in this experiment as the source of raw material gas. However, oxygen generators for successively generating high concentration oxygen of low temperature from compressed air may be also used as the oxygen source. Thus, it is possible for the latest ozonizers to successively produce high concentration ozone gas of tens of thousands of ppm using oxygen as the raw material gas. Of course, the concentration of the produced ozone water solution can not be increased in direct proportion to the concentration of ozone gas. Namely, it is also influenced by other factors such as kind, temperature, and pressure of the raw material water. Moreover, there is a limit in the amount of ozone to be dissolved in the raw material water or in the concentration of the ozone water solution. However, it is apparently understood that the level of ozone gas concentration achieved by the ozonizer has significant influence at least on the equilibrium concentration or time required for reaching the equilibrium concentration of the produced ozone water solution.

Therefore, we believe that the aforementioned high-performance creepage discharge type ozonizer made with high-purity alumina ceramic will elevate the level of equilibrium concentration much higher than that of Experiment 6 ($C_{Lm} = 14.0$ ppm). In addition, under condition of the same equilibrium concentration (14.0 ppm), such a newly developed ozonizer will shorten the time required for reaching the equilibrium concentration (180 minutes in Experiment 6) to the level of, for example, 90 minutes or so. Furthermore, there will be much increased the applicability to the production of ozone water solution of dried air which is lower in cost than pure oxygen.

As stated above, according to the method of this invention for producing a high concentration ozone water solution, ozone gas is injected into the raw material water as fine bubbles through ejector-type gas nozzles. Thus, more than 80% of the ozone gas fine bubbles introduced into the raw material water have diameters in the range of 10 to 200 μm, and the mean diameter of all the bubbles becomes 100 to 150 μm. The fine gas bubbles are present in the raw material water stably and successively. Therefore, the gas-liquid contact surface area between the ozone gas and the raw material water is greatly increased, and the raw material water in the ozone reaction tank is pressurized by the action of the pump for pressurizing the water flowing therethrough, thereby promoting the dissolution of ozone into the raw material water in the gas-liquid reaction. As a result, it becomes possible to produce a highly useful ozone water solution having a higher ozone concentration and a longer half-life period at a lower cost as compared with the prior art.

Various modifications will become possible for those skilled in the art after receiving the teachings of the present disclosure without departing from the scope thereof.

What is claimed is:

1. A method of producing a high concentration ozone water solution having a long half-life period, comprising:

pumping raw material water into a closed reaction tank;

withdrawing raw material water from near the bottom of the reaction tank and injecting it back into the reaction tank as a water jet while sucking ozone from a source by negative pressure generated along the stream of the water jet and circumferentially thereof, the ozone passing through a confined annular passage surrounding the water jet and thence into the reaction tank as fine gas bubbles; and introducing additional ozone under pressure from the source into the upper part of the reaction tank above the level of raw material water therein to elevate the internal pressure of the raw material water in the reaction tank.

2. The method of claim 1, wherein the raw material water is pumped into the closed reaction tank at a pressure of between 0 and 3 kgf/cm$^2$G and a temperature of between 3° and 15° C.

3. The method of claim 1, wherein the raw material water is selected from the group consisting of acidic electrolyzed water having a pH between 2 and 5.5, neutral distilled water of pH 7, and deionized water of pH 7.

4. The method of claim 1, wherein the source of ozone comes from dried air.

5. The method of claim 1, wherein the source of ozone comes from pure oxygen.

6. The method of claim 1, wherein the raw material water is withdrawn from the reaction tank and injected back into the tank substantially tangentially to a side wall thereof to cause the raw material water to circulate therein, the water being injected at a velocity of between 20 and 50 meters per second.

7. The method of claim 6, wherein the water is injected through a liquid nozzle needle having an inner diameter of between 0.3 and 1.2 mm and an outer diameter of between 0.6 and 1.6 mm.

8. The method of claim 7, wherein the ozone is supplied at the point of liquid discharge of the liquid nozzle needle, whereby the negative pressure generated by the water jet introduces the ozone into a cylindrical gas passage of between 1 and 6 mm in length and having an inner diameter of between 0.8 and 2.0 mm, the gas passage being positioned downstream of the liquid nozzle needle a distance between 0 and 6 mm, the gas passage being disposed coaxially with the liquid nozzle needle, whereby the ozone flows as an annular layer between 0.1 and 0.2 mm thick along the outer periphery of the jet of raw material water discharged by the liquid nozzle needle and interiorly of the inner surface of the gas passage, the ozone gas being injected into the raw material water in the reaction tank as bubbles having a mean diameter of between about 50 and 150 $\mu$m.

9. Apparatus for producing a high concentration ozone water solution having a long half-life, comprising:
- a closed ozone reaction tank for receiving raw material water therein, the tank having an inlet near its top, an outlet near its bottom, and an auxiliary inlet and outlet near its bottom;
- a by-pass circuit connected between the auxiliary inlet and the auxiliary outlet of the reaction tank and a pump connected in the bypass circuit for pumping water from the auxiliary outlet back into the tank through the auxiliary inlet;
- a source of ozone;
- an ozone generator connected to the source and adapted to generate a supply of ozone therefrom;
- an ejector-type gas nozzle in the by-pass circuit, the pump being adapted to pump water through the ejector-type gas nozzle to produce a water jet, the outlet of the ejector-type gas nozzle being disposed within the ozone reaction tank and substantially tangentially to a side wall thereof to cause the raw material water to circulate in the reaction tank, the outlet of the ozone generator being connected to the ejector-type gas nozzle, the ejector-type gas nozzle being adapted to inject a water jet into the ozone reaction tank and to suck ozone from the ozone generator by negative pressure generated along the stream of the water jet, thereby to inject the ozone into the raw material water in the ozone reaction tank as fine gas bubbles,
- the ejector-type gas nozzle comprising a liquid nozzle needle and a cylindrical gas passage positioned downstream of the liquid nozzle needle, the gas passage being disposed coaxially with the liquid nozzle needle, wherein the ozone flows as an annular layer between the outer periphery of the water jet discharged by the liquid nozzle needle and the inner surface of the gas passage;
- gas introducing means connected to the ozone generator for introducing ozone from the generator into the upper part of the ozone reaction tank; and
- a pressure controller for controlling the pressure of the ozone gas introduced into the upper part of the ozone reaction tank.

10. Apparatus according to claim 9, further comprising a cooler for cooling the raw material water in the ozone reaction tank.

11. Apparatus according to claim 9, wherein the liquid nozzle needle has an inner diameter of between 0.3 and 1.2 mm and an outer diameter of between 0.6 and 1.6 mm.

12. Apparatus according to claim 11, wherein the cylindrical gas passage is between 1 and 6 mm in length and has an inner surface diameter of between 0.8 and 2.0 mm, the passage being positioned downstream of the liquid nozzle needle a distance between 0 and 6 mm, wherein the ozone flows as an annular layer between 0.1 and 0.2 mm thick between the outer periphery of the water jet discharged by the liquid nozzle needle and the inner surface of the gas passage.

* * * * *